United States Patent
Gallagher et al.

(10) Patent No.: US 12,209,369 B2
(45) Date of Patent: Jan. 28, 2025

(54) BI-DIRECTIONAL MOTOR FOR GAS ENGINE REPLACEMENT DEVICE

(71) Applicant: MILWAUKEE ELECTRIC TOOL CORPORATION, Brookfield, WI (US)

(72) Inventors: Patrick D. Gallagher, Oak Creek, WI (US); Timothy J. Bartlett, Waukesha, WI (US); Timothy R. Obermann, Waukesha, WI (US); Alexander Huber, Menomonee Falls, WI (US); Connor P. Sprague, Milwaukee, WI (US); Evan M. Glanzer, Milwaukee, WI (US); John E. Koller, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 1038 days.

(21) Appl. No.: 17/091,886

(22) Filed: Nov. 6, 2020

(65) Prior Publication Data
US 2021/0140130 A1    May 13, 2021

Related U.S. Application Data

(60) Provisional application No. 62/932,715, filed on Nov. 8, 2019.

(51) Int. Cl.
*E01C 19/40* (2006.01)
*B06B 1/16* (2006.01)
(Continued)

(52) U.S. Cl.
CPC .............. *E01C 19/402* (2013.01); *B06B 1/16* (2013.01); *H02K 7/1004* (2013.01); *H02K 7/108* (2013.01);
(Continued)

(58) Field of Classification Search
CPC ......... E01C 19/402; E01C 19/38; B06B 1/16; H02K 7/1004; H02K 7/108; H02K 7/116;
(Continued)

(56) References Cited

U.S. PATENT DOCUMENTS

| | | | | |
|---|---|---|---|---|
| 5,149,225 A | * | 9/1992 | Artzberger | ................ F16H 9/04 74/61 |
| 5,220,257 A | * | 6/1993 | Yoshino | .................... H02P 6/24 318/400.03 |

(Continued)

FOREIGN PATENT DOCUMENTS

| | | |
|---|---|---|
| CN | 204206792 U | 3/2015 |
| CN | 205188931 U | 4/2016 |

(Continued)

OTHER PUBLICATIONS

International Search Report and Written Opinion for Application No. PCT/US2020/059480 dated Mar. 2, 2021 (8 pages).

(Continued)

*Primary Examiner* — Phutthiwat Wongwian
*Assistant Examiner* — Susan E Scharpf
(74) *Attorney, Agent, or Firm* — Michael Best & Friedrich LLP

(57) ABSTRACT

Bi-directional motor (36) for gas engine replacement device (10). One embodiment provides a gas engine replacement device (10) including a housing (14), a battery receptacle (54), a motor (36), a power take-off shaft (38) receiving torque from the motor (36), a power switching network (310) configured to selectively provide power to the motor (36), and an electronic processor (302) coupled to the power switching network (310). The electronic processor (302) is configured to rotate the motor (36) in a first direction and receive an input to switch a rotation direction of the motor (36). The electronic processor is also configured to control (Continued)

the power switching network (310) to stop the motor (36) and rotate the motor (36) in a second direction after controlling the power switching network (310) to stop the motor (36).

5 Claims, 14 Drawing Sheets

(51) Int. Cl.
| | |
|---|---|
| *H02K 7/10* | (2006.01) |
| *H02K 7/108* | (2006.01) |
| *H02K 7/116* | (2006.01) |
| *H02K 11/00* | (2016.01) |
| *H02K 11/33* | (2016.01) |
| *H02K 21/16* | (2006.01) |
| *H02P 6/24* | (2006.01) |
| *H02P 6/30* | (2016.01) |

(52) U.S. Cl.
CPC ......... *H02K 7/116* (2013.01); *H02K 11/0094* (2013.01); *H02K 11/33* (2016.01); *H02K 21/16* (2013.01); *H02P 6/24* (2013.01); *H02P 6/30* (2016.02)

(58) Field of Classification Search
CPC .... H02K 11/0094; H02K 11/33; H02K 21/16; H02K 9/227; H02K 11/215; H02K 11/27; H02K 2213/03; H02K 7/14; H02K 21/14; H02P 6/24; H02P 6/30; H02P 6/00
See application file for complete search history.

(56) References Cited

U.S. PATENT DOCUMENTS

| | | | | |
|---|---|---|---|---|
| 5,387,052 | A * | 2/1995 | Artzberger | E01C 19/38 |
| | | | | 192/48.91 |
| 5,787,693 | A * | 8/1998 | Dyke | A01D 34/78 |
| | | | | 56/2 |
| 5,816,741 | A * | 10/1998 | Troppman, III | E01C 19/283 |
| | | | | 404/127 |
| 9,154,009 | B2 | 10/2015 | Alemu | |
| 9,450,472 | B2 * | 9/2016 | Hatfield | H02K 5/225 |
| 10,469,000 | B2 | 11/2019 | Bachmann et al. | |
| 10,505,472 | B2 * | 12/2019 | Ahmed | H02P 6/085 |
| 2007/0054178 | A1 * | 3/2007 | Moon | H01M 50/572 |
| | | | | 429/62 |
| 2013/0046448 | A1 * | 2/2013 | Fan | A01D 34/68 |
| | | | | 56/10.8 |
| 2014/0096986 | A1 | 4/2014 | Hirabayashi et al. | |
| 2016/0087560 | A1 * | 3/2016 | Miller | H02P 6/085 |
| | | | | 318/400.06 |
| 2018/0138839 | A1 | 5/2018 | Puzio et al. | |
| 2019/0006980 | A1 | 1/2019 | Sheeks et al. | |
| 2019/0238083 | A1 * | 8/2019 | White | H01M 50/20 |
| 2020/0001446 | A1 | 1/2020 | Ballard et al. | |
| 2020/0076337 | A1 * | 3/2020 | Abbott | H02K 11/0094 |
| 2020/0106373 | A1 | 4/2020 | Schneider | |
| 2020/0313582 | A1 | 10/2020 | Hattori et al. | |

FOREIGN PATENT DOCUMENTS

| | | |
|---|---|---|
| EP | 0101801 A1 | 3/1984 |
| GB | 2565271 A | 2/2019 |
| JP | S5180514 A | 7/1976 |
| JP | S5256702 A | 5/1977 |
| JP | S55120384 A | 9/1980 |
| JP | S5749378 A | 3/1982 |
| JP | H01224484 A | 9/1989 |
| JP | H04112694 A | 4/1992 |
| JP | H08340696 A | 12/1996 |
| JP | H093818 A | 1/1997 |
| JP | H11287497 A | 10/1999 |
| JP | H11311195 A | 11/1999 |
| JP | H11316062 A | 11/1999 |
| JP | 2007223363 A | 9/2007 |
| JP | 2009284719 A | 12/2009 |
| JP | 2012131004 A | 7/2012 |
| JP | 2016008507 A | 1/2016 |
| JP | 2017026187 A | 2/2017 |
| JP | 6092392 B2 | 3/2017 |
| JP | 2017048768 A | 3/2017 |
| JP | 2019051579 A | 4/2019 |
| JP | 2019065458 A | 4/2019 |

OTHER PUBLICATIONS

Japanese Patent Office Action for Application No. 2022-525891 dated Jul. 11, 2023 (14 pages including machine English translation).

Extended European Search Report for Application No. 20885499.2 dated Oct. 24, 2023 (13 pages).

Japanese Patent Office Action for Application No. 2023-206550 dated Nov. 26, 2024 (18 pages including machine English translation).

* cited by examiner

BI-DIRECTIONAL MOTOR FOR GAS ENGINE REPLACEMENT DEVICE

RELATED APPLICATIONS

This application claims the benefit of U.S. Provisional Patent Application No. 62/932,715, filed on Nov. 8, 2019, the entire content of which is hereby incorporated by reference.

FIELD

The present application relates to gas engine replacement motor units and, more particularly, to gas engine replacement motor units for use with power equipment.

BACKGROUND

Small, single or multi-cylinder gasoline engines can be mounted to power equipment to drive the equipment with a power take-off shaft.

SUMMARY

One embodiment provides a gas-engine replacement device including a housing, a battery receptacle coupled to the housing and configured to removably receive a battery pack, and a motor located within the housing. The gas-engine replacement device also includes a power take-off shaft receiving torque from the motor and protruding from a side of the housing, a power switching network configured to selectively provide power from the battery pack to the motor, and an electronic processor coupled to the power switching network and configured to control the power switching network to rotate the motor. The electronic processor is configured to rotate the motor in a first direction and receive an input to switch a rotation direction of the motor. The electronic processor is also configured to control the power switching network to stop the motor by performing one selected from a group consisting of: coasting the motor to a stop, applying passive braking to stop the motor, applying active braking to stop the motor, and dynamically pulsing the motor in opposite phases to the first direction, and rotate the motor in a second direction after controlling the power switching network to stop the motor.

Another embodiment provides an outdoor power equipment including a gas-engine replacement device. The gas-engine replacement device includes a housing, a battery receptacle coupled to the housing and configured to removably receive a battery pack, and a motor located within the housing. The gas-engine replacement device also includes a power take-off shaft receiving torque from the motor and protruding from a side of the housing, a power switching network configured to selectively provide power from the battery pack to the motor, and an electronic processor coupled to the power switching network and configured to control the power switching network to rotate the motor. The outdoor power equipment also includes a first clutching mechanism coupling the power take-off shaft to a first equipment bit and configured to activate the first equipment bit when the motor is rotating in a first direction and deactivate the first equipment bit when the motor is rotating in a second direction.

In some constructions, the outdoor power equipment further includes a second clutching mechanism coupling the power take-off shaft to a second equipment bit and configured to activate the second equipment bit when the motor is rotating in the second direction and deactivate the second equipment bit when the motor is rotating in the first direction.

In some constructions, the first equipment bit is a first vibration mechanism configured to drive a first vibration plate and the second equipment bit is a second vibration mechanism configured to drive a second vibration plate.

In some constructions, the outdoor power equipment also includes wheels configured to advance the outdoor power equipment on ground, wherein the first equipment bit is a vibration mechanism configured to drive a vibration plate and wherein the second equipment bit is an axle driving the wheels.

Yet another embodiment provides a compactor system including a frame having a handle, a vibration plate supported by the frame, a vibration mechanism configured to drive the vibration plate, and a gas-engine replacement device. The gas-engine replacement device includes a housing, a battery receptacle coupled to the housing and configured to removably receive a battery pack, and a motor located within the housing. The gas-engine replacement device also includes a power switching network configured to selectively provide power from the battery pack to the motor and a power take-off shaft receiving torque from the motor and protruding from a side of the housing. The power take-off shaft is connected to the vibration mechanism to drive the vibration mechanism. The gas-engine replacement device further includes an electronic processor coupled to the power switching network and configured to control the power switching network to rotate the motor. The electronic processor is configured to rotate the motor in a first direction. The vibration mechanism causes the vibration plate to vibrate and advance in a forward direction for movement of the compactor system when the motor is rotated in the first direction. The electronic processor is configured to rotate the motor in a second direction. The vibration mechanism causes the vibration plate to vibrate but does not advance the vibration plate in the forward direction.

Yet another embodiment provides a compactor system including a frame having a handle, a first vibration plate supported by the frame, and a first vibration mechanism configured to drive the first vibration plate. The compactor system also includes a second vibration plate supported by the frame, a second vibration mechanism configured to drive the second vibration plate, and a gas-engine replacement device. The gas-engine replacement device includes a housing, a battery receptacle coupled to the housing and configured to removably receive a battery pack, and a motor located within the housing. The gas-engine replacement device also includes a power switching network configured to selectively provide power from the battery pack to the motor, an electronic processor coupled to the power switching network and configured to control the power switching network to rotate the motor, and a power take-off shaft receiving torque from the motor and protruding from a side of the housing. The power take-off shaft is connected to the first vibration mechanism to drive the first vibration mechanism through a first clutching mechanism and is connected to the second vibration mechanism to drive the second vibration mechanism through a second clutching mechanism. The first clutching mechanism operably engages the power-take-off shaft to the first vibration mechanism when the motor is rotated in a first direction and the first clutching mechanism operably disengages the power-take-off shaft to the first vibration mechanism when the motor is rotated in a second direction. The second clutching mechanism operably engages the power-take-off shaft to the second vibration mechanism when the motor is rotated in the second direction and the second clutching mechanism operably disengages the power-take-off shaft to the second vibration mechanism when the motor is rotated in the first direction.

Yet another embodiment provides a compactor system including a frame including a handle, a vibration plate supported by the frame, and a vibration mechanism configured to drive the vibration plate. The compactor system also includes wheels supported by the frame to advance the compactor system on ground, and a gas-engine replacement device. The gas-engine replacement device includes a housing, a battery receptacle coupled to the housing and configured to removably receive a battery pack, and a motor located within the housing. The gas-engine replacement device also includes a power switching network configured to selectively provide power from the battery pack to the motor, an electronic processor coupled to the power switching network and configured to control the power switching network to rotate the motor, and a power take-off shaft receiving torque from the motor and protruding from a side of the housing. The power take-off shaft is connected to the vibration mechanism to drive the vibration mechanism and connected to the wheels through a clutching mechanism. When the motor is rotated in a first direction, the clutching mechanism operably engages the power take-off shaft to the wheels to advance the compactor system in a forward direction and when the motor is rotated in a second direction, the clutching mechanism operably disengages the power take-off shaft to the wheels.

Yet another embodiment provides a compactor system comprising a frame including a handle, a first vibration mechanism configured to drive a first vibration plate, and a first battery-powered gas-engine replacement device. The first battery-powered gas-engine replacement device includes a first motor, a first electronic processor coupled to the first motor and configured to control rotation of the first motor, and a first power take-off shaft receiving torque from the first motor and connected to the first vibration mechanism to drive the first vibration mechanism. The compactor system also includes a second vibration mechanism configured to drive a second vibration plate and a second battery-powered gas-engine replacement device. The second battery-powered gas-engine replacement device includes a second motor, a second electronic processor coupled to the second motor and configured to control rotation of the second motor, and a second power take-off shaft receiving torque from the second motor and connected to the second vibration mechanism to drive the second vibration mechanism. The compactor system further includes a main electronic processor electrically connected to the first electronic processor and the second electronic processor. The main electronic processor is configured to determine a mode of operation of the compactor system, provide first control signals to the first electronic processor based on the mode of operation, and provide second control signals to the second electronic processor based on the mode of operation.

Before any embodiments are explained in detail, it is to be understood that the embodiments are not limited in its application to the details of construction and the arrangement of components set forth in the following description or illustrated in the following drawings. Embodiments described herein are capable of being practiced in or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Additionally, as used herein with a list of items, "and/or" means that the items may be taken all together, in sub-sets, or as alternatives (for example, "A, B, and/or C" means A; B; C; A and B; B and C; A and C; or A, B, and C).

It should be noted that a plurality of hardware and software based devices, as well as a plurality of different structural components may be utilized to implement embodiments described herein. Furthermore, and as described in subsequent paragraphs, the specific configurations illustrated in the drawings are intended as example embodiments and other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments.

Other features and aspects will become apparent by consideration of the following detailed description and accompanying drawings.

DETAILED DESCRIPTION

Figure 1:
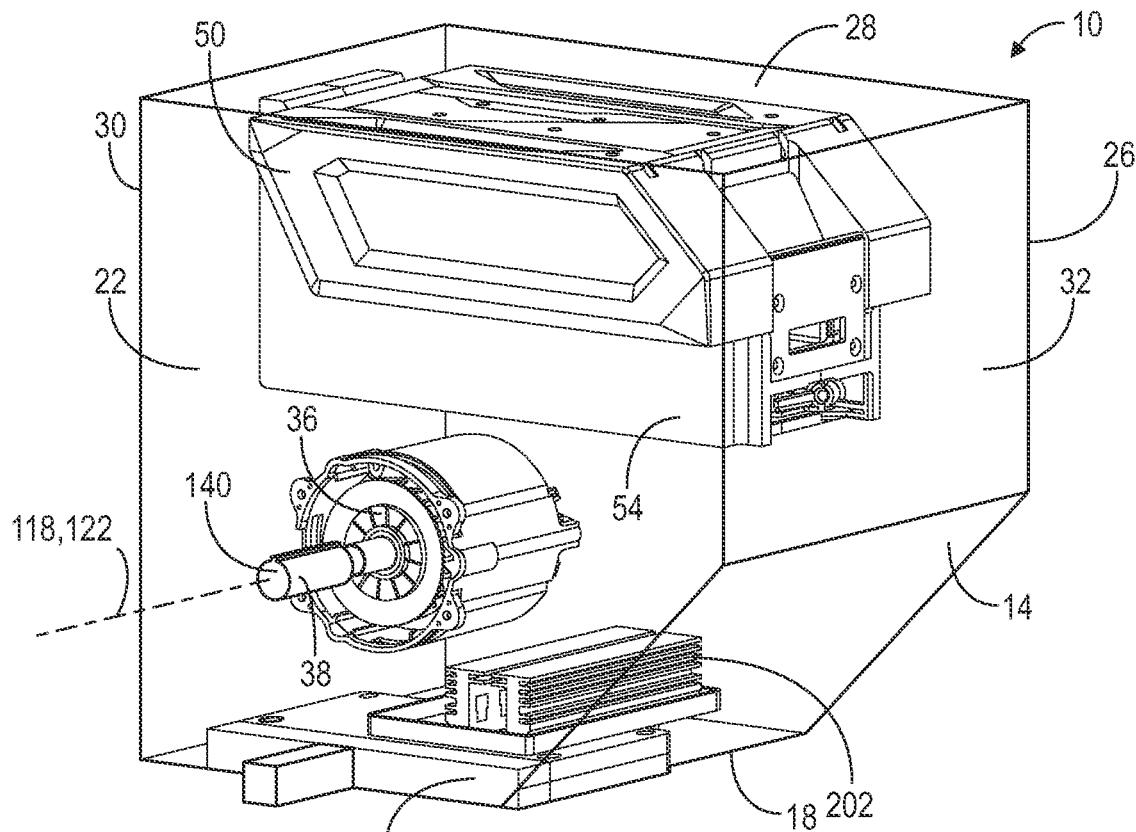
FIG. 1 is a perspective view of a gas engine replacement device in accordance with an embodiment.
Figure 2:
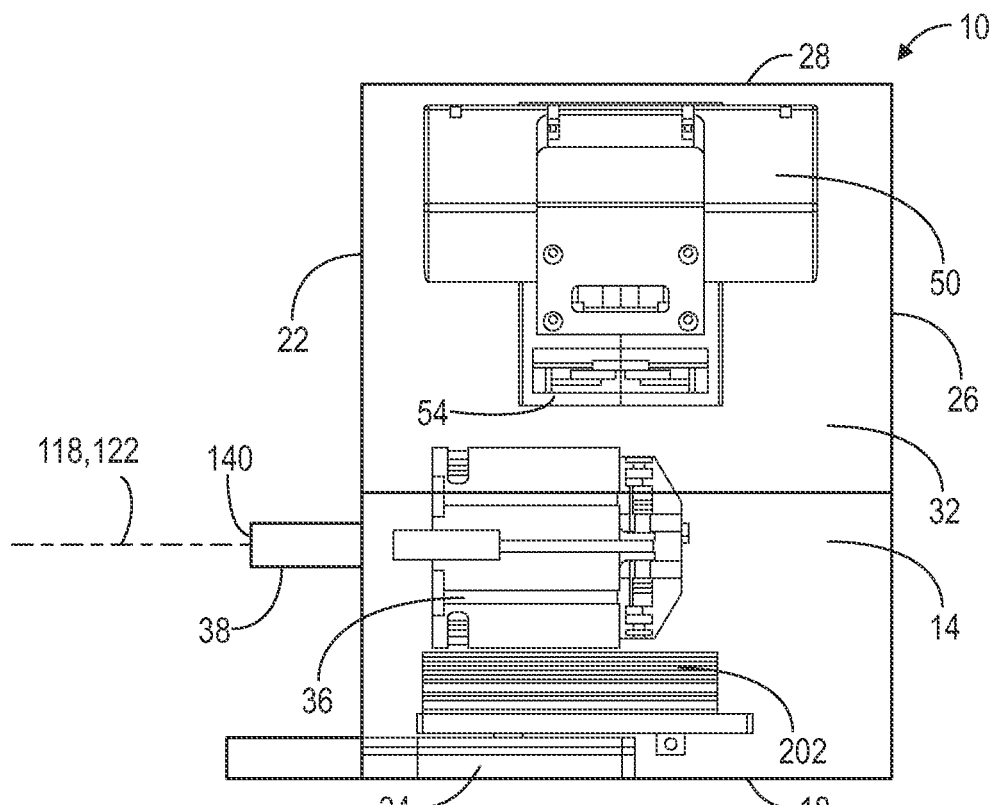
FIG. 2 is a plan view of the gas engine replacement device of FIG. 1.
Figure 3:
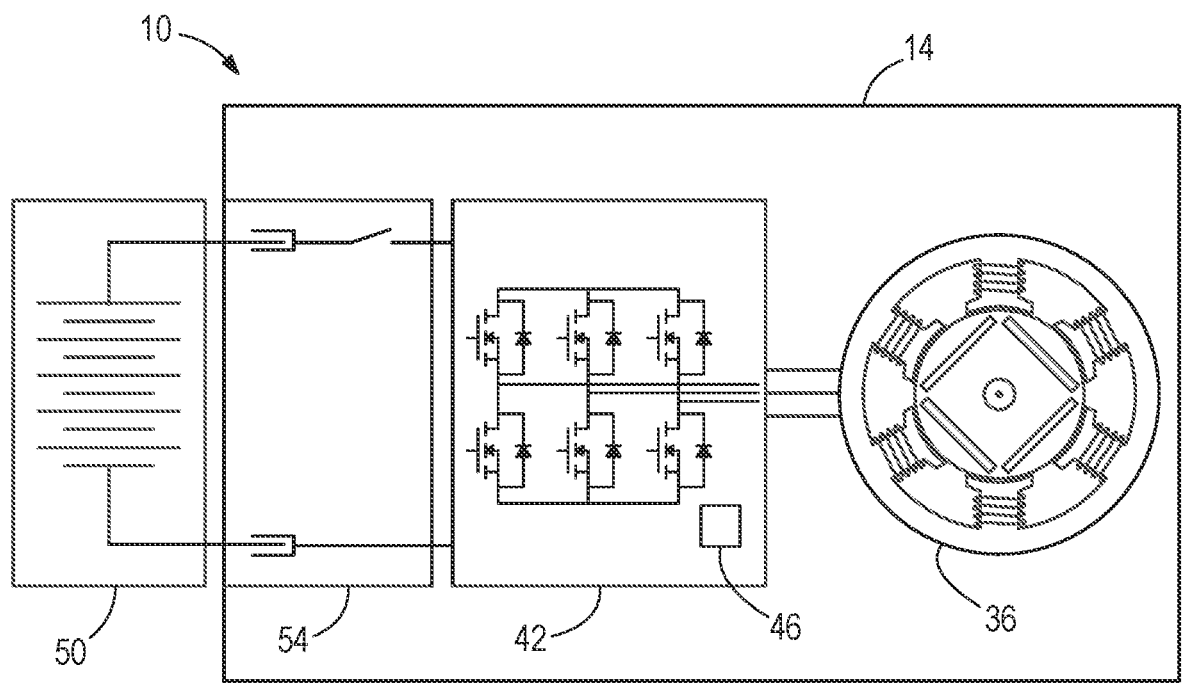
FIG. 3 is a schematic view of the gas engine replacement device of FIG. 1.

As shown in FIGS. 1 and 2, a gas engine replacement device 10 for use with a piece of power equipment includes a housing 14 with a first side 18, a second side 22 adjacent the first side 18, a third side 26 opposite the second side 22, a fourth side 28 opposite the first side 18, a fifth side 30 extending between the second and third sides 22, 26, and a sixth side 32 opposite the fifth side 30. The gas engine replacement device 10 also includes a flange 34 coupled to the housing 14 on the first side 18, an electric motor 36 located within the housing 14, and a power take-off shaft 38 that protrudes from the second side 22 and receives torque from the motor 36. As explained in further detail below, in some embodiments, the power take-off shaft 38 protrudes from the first side 18 and from the flange 34. As shown in FIG. 3, the gas engine replacement device 10 also includes control electronics 42 positioned within the housing 14 and including wiring and a controller 46 that is electrically connected to the motor 36. A similar gas engine replacement device 10 is described and illustrated in U.S. patent application Ser. No. 16/551,197, filed Aug. 26, 2019, the entire content of which is incorporated herein by reference.

Figure 4:
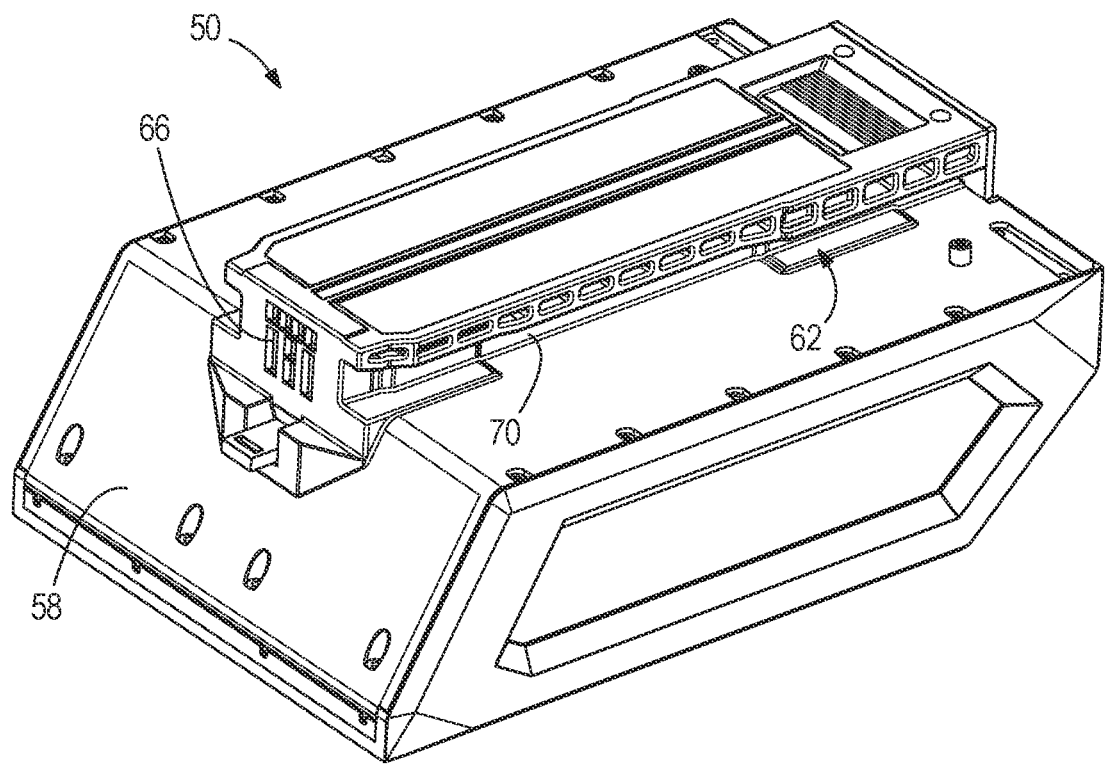
FIG. 4 is a perspective view of a battery pack of the gas engine replacement device of FIG. 1.
Figure 5:
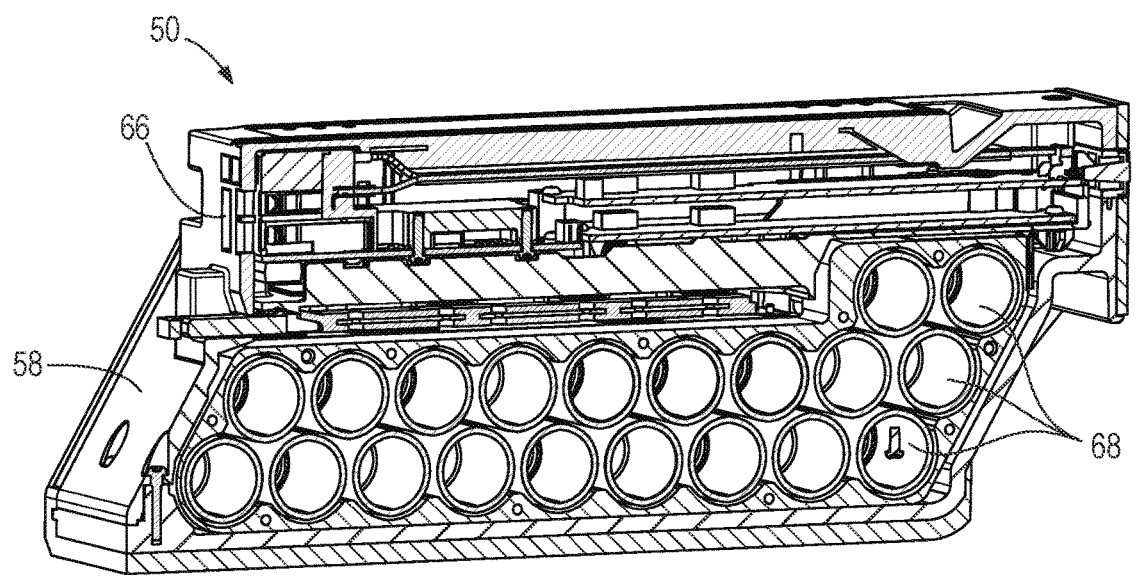
FIG. 5 is a cross-sectional view of the battery pack of FIG. 4.
Figure 6:
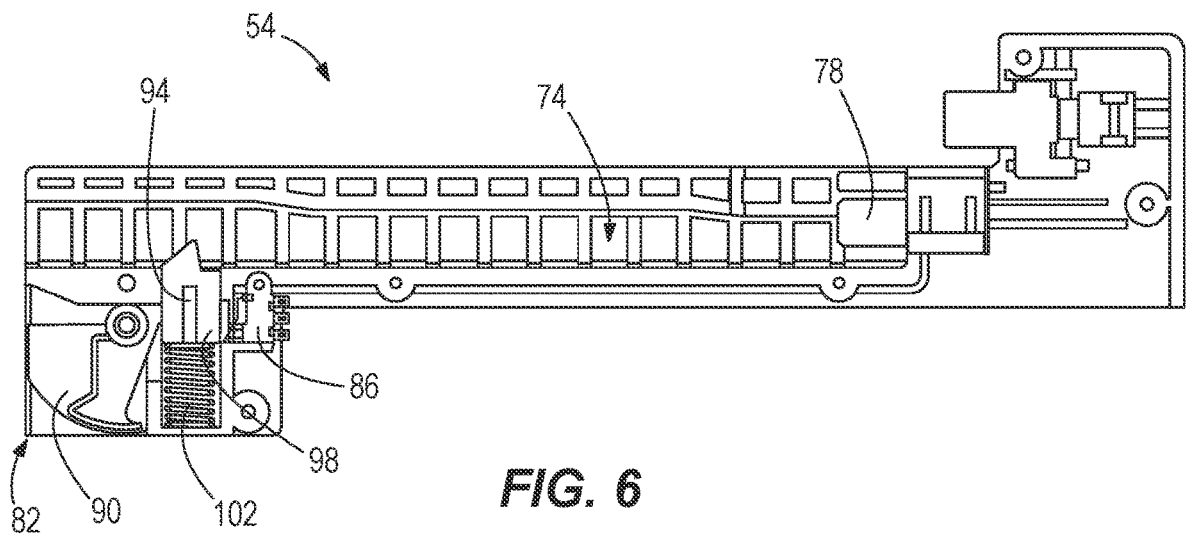
FIG. 6 is a cross-sectional view of a battery receptacle of the gas engine replacement device of FIG. 1.

As shown in FIGS. 1-6, the gas engine replacement device 10 also includes a battery pack 50 that is removably received in a battery receptacle 54 in the housing 14 to transfer current from the battery pack 50 to the motor 36 via the control electronics 42. With reference to FIGS. 4-6, the battery pack 50 includes a battery pack housing 58 with a support portion 62 and a first terminal 66 that is electrically connected to a plurality of battery cells 68 supported by the pack housing 58. The support portion 62 provides a slide-on arrangement with a projection/recess portion 70 cooperating with a complementary projection/recess portion 74 (shown in FIG. 6) of the battery receptacle 54. In the embodiment illustrated in FIGS. 4-6, the projection/recess portion 70 of the battery pack 50 is a guide rail and the projection/recess portion 74 of the battery receptacle 54 is a guide recess. A similar battery pack is described and illustrated in U.S. Patent Publication No. 2019/0006980 filed Jul. 2, 2018, the entire content of which is incorporated herein by reference. In some embodiments, the battery cells 68 have a nominal voltage of up to about 80 V. In some embodiments, the battery cells 68 have a nominal voltage of up to about 120 V. In some embodiments, the battery pack 50 has a weight of up to about 6 lb. In some embodiments, each of the battery cells 68 has a diameter of up to 21 mm and a length of up to about 71 mm. In some embodiments, the battery pack 50 includes up to twenty battery cells 68. In some embodiments, the battery cells 68 are connected in series. In some embodiments, the battery cells 68 are operable to output a sustained operating discharge current of between about 40 A and about 60 A. In some embodiments, each of the battery cells 68 has a capacity of between about 3.0 Ah and about 5.0 Ah.

FIG. 6 illustrates the battery receptacle 54 of the gas engine replacement device 10 in accordance with some embodiments. The battery receptacle 54 includes the projection/recess 74, a second terminal 78, a latching mechanism 82, and a power disconnect switch 86. The projection/recess 74 cooperates with the projection/recess 70 of the battery pack 50 to attach the battery pack 50 to the battery receptacle 54 of the gas engine replacement device 10. When the battery pack 50 is attached to the gas engine replacement device 10, the second terminal 78 and the first terminal 66 are electrically connected to each other. The latching mechanism 82 protrudes from a surface of the battery receptacle 54 and is configured to engage the battery pack 50 to maintain engagement between the battery pack 50 and the battery receptacle 54. Thus, the battery pack 50 is connectable to and supportable by the battery receptacle 54 such that the battery pack 50 is supportable by the housing 14 of the gas engine replacement device 10. In some embodiments, the battery pack receptacle 54 is arranged on the housing 14 in a position to create a maximum possible distance of separation between the motor 36 and the battery pack 50, in order to inhibit vibration transferred from the motor 36 to the battery pack 50. In some embodiments, elastomeric members are positioned on the battery pack receptacle 54 in order to inhibit vibration transferred from the motor 36, via the housing 14, to the battery pack 50.

In other embodiments (not shown), the latching mechanism 82 may be disposed at various locations (e.g., on a sidewall, an end wall, an upper end wall etc., of the battery receptacle 54) such that the latching mechanism 82 engages corresponding structure on the battery pack 50 to maintain engagement between the battery pack 50 and the battery receptacle 54. The latching mechanism 82 includes a pivotable actuator or handle 90 operatively engaging a latch member 94. The latch member 94 is slidably disposed in a bore 98 of the receptacle 54 and is biased toward a latching position by a biasing member 102 (e.g., a spring) to protrude through a surface of the battery receptacle 54 and into a cavity in the battery pack 50.

The latching mechanism also 82 includes the power disconnect switch 86 (e.g., a micro-switch) facilitating electrical connecting/disconnecting the battery pack 50 from the battery receptacle 54 during actuation of the handle 90 to withdraw the latch member 94 from the battery pack 50. The power disconnect switch 86 may act to electrically disconnect the battery pack 50 from the gas engine replacement device 10 prior to removal of the battery pack 50 from the battery receptacle 54. The power disconnect switch 86 is actuated when the latch member 94 is moved from the latched position (i.e., when the latch member 94 is completely within the cavity of the battery pack 50) to an intermediate position. The power disconnect switch 86 is electrically connected to the controller 46 and may generate an interrupt to indicate that the battery pack 50 is being disconnected from the gas engine replacement device 10. When the controller 46 receives the interrupt, the controller 46 begins a power down operation to safely power down the control electronics 42 of the gas engine replacement device 10. A similar latching mechanism and disconnect switch is described and illustrated in U.S. Patent Publication No. 2019/0006980, which has been incorporated herein by reference.

Figure 7:
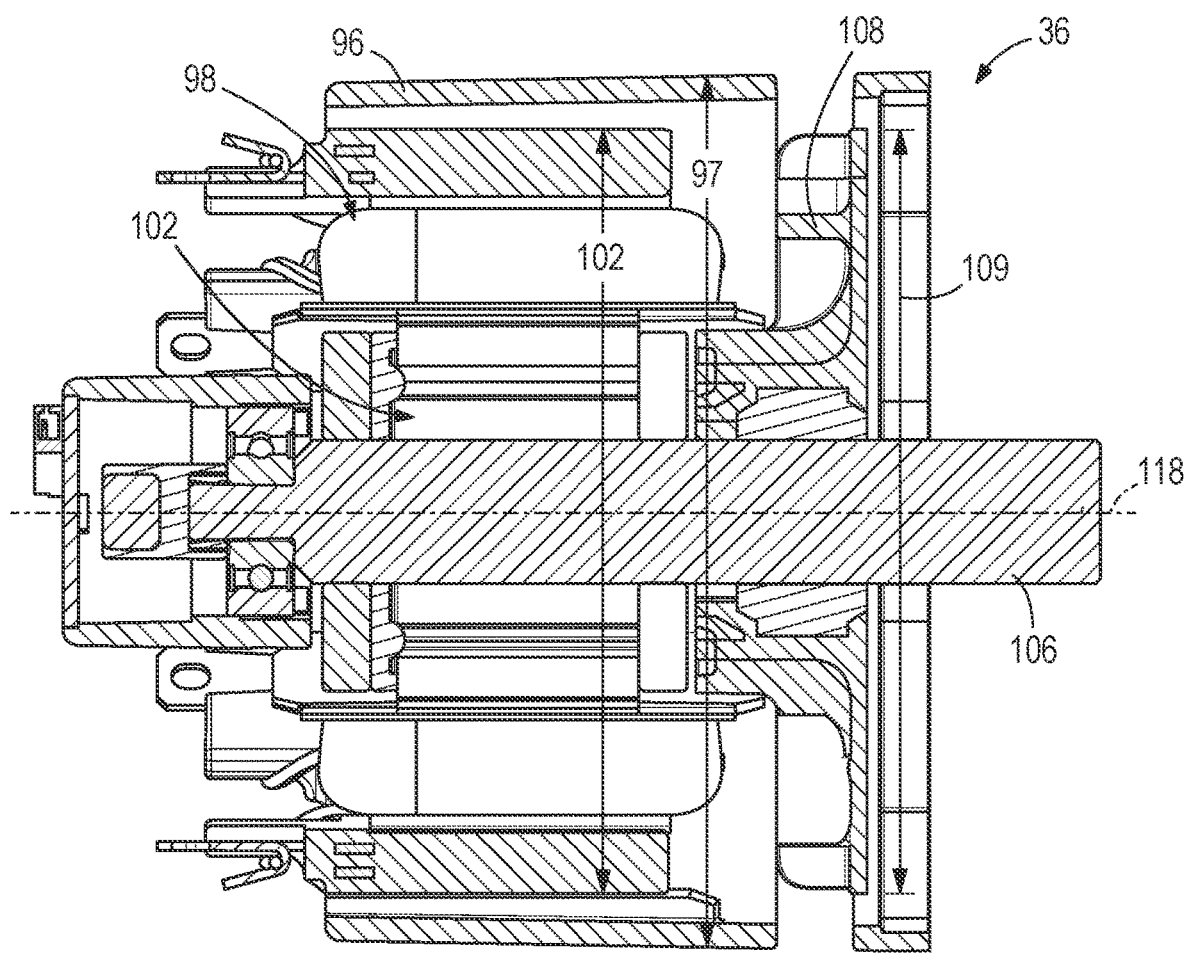
FIG. 7 is a cross-sectional view of a motor of the gas engine replacement device of FIG. 1.

As shown in FIG. 7, the motor 36 includes a motor housing 96 having an outer diameter 97, a stator 98 having a nominal outer diameter 102 of up to about 80 mm, a rotor 102 having an output shaft 106 and supported for rotation within the stator 98, and a fan 108. A similar motor is described and illustrated in U.S. Patent Publication No. 2019/0006980, which has been incorporated herein by reference. In some embodiments, the motor 36 is a brushless direct current motor. In some embodiments, the motor 36 has a power output of at least about 2760 W. In some embodiments, the power output of the motor 36 may drop below 2760 W during operation. In some embodiments, the fan 108 has a diameter 109 that is larger diameter 97 of the motor housing 96. In some embodiments, the motor 36 can be stopped with an electronic clutch (not shown) for quick overload control. In some embodiments, the motor 36 has a volume of up to about 443,619 mm$^3$. In some embodiments, the motor has a weight of up to about 4.6 lb. The housing 14 includes an inlet vent and an outlet vent, such that the motor fan 108 pulls air through the inlet vent and along the control electronics 42 to cool the control electronics 42, before the air is exhausted through the outlet vent. In the embodiment illustrated in FIG. 7, the motor 36 is an internal rotor motor, but in other embodiments, the motor 36 can be an outer rotor motor with a nominal outer diameter (i.e. the nominal outer diameter of the rotor) of up to about 80 mm.

Figure 8:
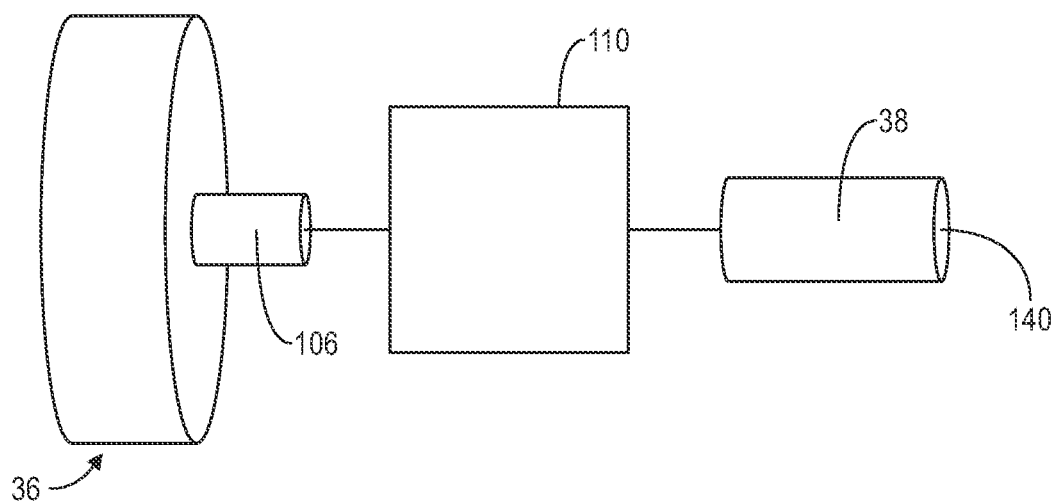
FIG. 8 is a schematic view of a motor, a gear train, and a power take-off shaft of the gas engine replacement device of FIG. 1.

With reference to FIG. 8, the motor 36 can transfer torque to the power take-off shaft 38 in a variety of configurations. In some embodiments, the output shaft 106 is also the power take-off shaft 38, such that the motor 36 directly drives the power take-off shaft 38 without any intermediate gear train. For example, the motor 36 may be a direct drive high pole count motor. As shown in FIG. 8, in other embodiments, the gas engine replacement device 10 includes a gear train 110 that transfers torque from the motor 36 to the power take-off shaft 38. In some embodiments, the gear train 110 can include a mechanical clutch (not shown) to discontinue the transfer of torque from the motor 36 to the power take-off shaft 38. In some embodiments, the gear train 110 may include a planetary transmission that transfers torque from the output shaft 106 to the power take-off shaft 38, and a rotational axis of the output shaft 106 is coaxial with a rotational axis of the power take-off shaft 38. In some embodiments, the gear train 110 includes a spur gear engaged with the output shaft 106 of the rotor, such that the rotational axis of the output shaft 106 is offset from and parallel to the rotational axis of the power take-off shaft 38. In some embodiments, the gear train 110 includes a bevel gear, such that the rotational axis of the output shaft 106 is perpendicular to the rotational axis of the power take-off shaft 38. In other embodiments utilizing a bevel gear, the rotational axis of the output shaft 106 is not perpendicular, parallel, or coaxial to the rotational axis of the power take-off shaft 38, and the power take-off shaft 38 protrudes from the flange 34.

In some embodiments, the gas engine replacement device 10 includes ON/OFF indicators (not shown). In some embodiments, the gas engine replacement device 10 includes a filter (not shown) to keep airborne debris out of the motor 36 and control electronics 42. In some embodiments, the filter includes a dirty filter sensor (not shown) and a self-cleaning mechanism (not shown). In some embodiments, the motor 36 will mimic a gas engine response when encountering resistance, such as slowing down or bogging. In some embodiments, the gas engine replacement device 10 includes a heat sink 202 in the housing 14 for air-cooling the control electronics 42 (FIGS. 1 and 2). In some embodiments, the gas engine replacement device 10 is liquid cooled.

In some embodiments, the output shaft 106 of the rotor 102 has both forward and reverse capability as further described below. In some embodiments, the forward and reverse capability is controllable without shifting gears of the gear train 110, in comparison to gas engines, which cannot achieve forward/reverse capability without extra gearing and time delay. Thus, the gas engine replacement device 10 provides increased speed, lower weight, and lower cost. Because the gas engine replacement device 10 has fewer moving parts and no combustion system, as compared with a gas engine, it also provides additional speed, weight, and cost advantages.

The gas engine replacement device 10 is able to operate in any orientation (vertical, horizontal, upside down) with respect to a ground surface for a prolonged period of time, giving it an advantage over four-cycle gas engines, which can only be operated in one orientation and at slight inclines for a shorter period of time. Because the gas engine replacement device 10 does not require gas, oil, or other fluids, it can run, be transported, and be stored upside down or on any given side without leaking or flooding In operation, the gas engine replacement device 10 can be used to replace a gas engine system. Specifically, the gas engine replacement device 10 can be mounted to the piece of power equipment having a second bolt pattern by aligning a first bolt pattern defined by the plurality of apertures in the flange 34 with the second bolt pattern. In some embodiments, the flange 34 may include one or more intermediate mounting members or adapters arranged between the flange 34 itself and the flange of the piece of power equipment having the second bolt pattern, such that the adapter(s) couple the flange 34 to the piece of power equipment. In these embodiments, the adapter includes both the second bolt pattern and the first bolt pattern, such that the first bolt pattern of the flange 34 aligns with the first bolt pattern of the adapter and the second bolt pattern of the adapter aligns with the second bolt pattern defined in the piece of power equipment, thereby allowing the flange 34 of the gas engine replacement device 10 to be coupled to the piece of power equipment.

Alternatively, the gas engine replacement device 10 can be connected to a piece of power equipment using a belt system by providing a belt that operatively connects the power take-off shaft and an equipment bit. Thus, the power take-off shaft 38 of the gas engine replacement device 10 can be used to drive the equipment.

During operation, the housing 14 of the gas engine replacement device 10 is comparably much cooler than the housing of an internal combustion unit because there is no combustion in the gas engine replacement device 10. Specifically, when a gas engine unit runs, the housing of the gas engine unit is 220 degrees Celsius or higher. In contrast, when the gas engine replacement device 10 runs, all of the exterior surfaces of the housing 14 are less than 95 degrees Celsius. Tables 1 and 2 below list with further specificity the temperature limits of different components on the housing 14 of the gas engine replacement device 10.

Table 1 below lists the Underwriter's Laboratories (UL) temperature limits of different components typically used in power tools, with respect to whether those components are formed of metal, plastic, rubber, wood, porcelain, or vitreous. For example, at least in some embodiments, the plastic rated temperatures are never exceeded by the gas engine replacement device 10.

TABLE 1

|  | Metal | Plastic/ Rubber/Wood | Porcelain/ Vitreous |
|---|---|---|---|
| Casual Contact | 85° C. | 85° C. | 85° C. |
| Handles and knobs that are continuously held | 55° C. | 75° C. | 65° C. |
| Handles and knobs that are only briefly held (i.e. switches) | 60° C. | 80° C. | 70° C. |

Table 2 below lists the UL temperature limits of different components of the battery pack housing 58 of the battery pack 50, with respect to whether those components are formed of metal, plastic or rubber. For example, at least in some embodiments, the plastic rated temperatures are never exceeded by the gas engine replacement device 10.

TABLE 2

|  | Metal | Plastic/ Rubber |
|---|---|---|
| Casual Contact | 70° C. | 95° C. |
| Handles and knobs that are continuously held | 55° C. | 75° C. |
| Handles and knobs that are only briefly held (i.e. switches) | 60° C. | 85° C. |

Figure 9:
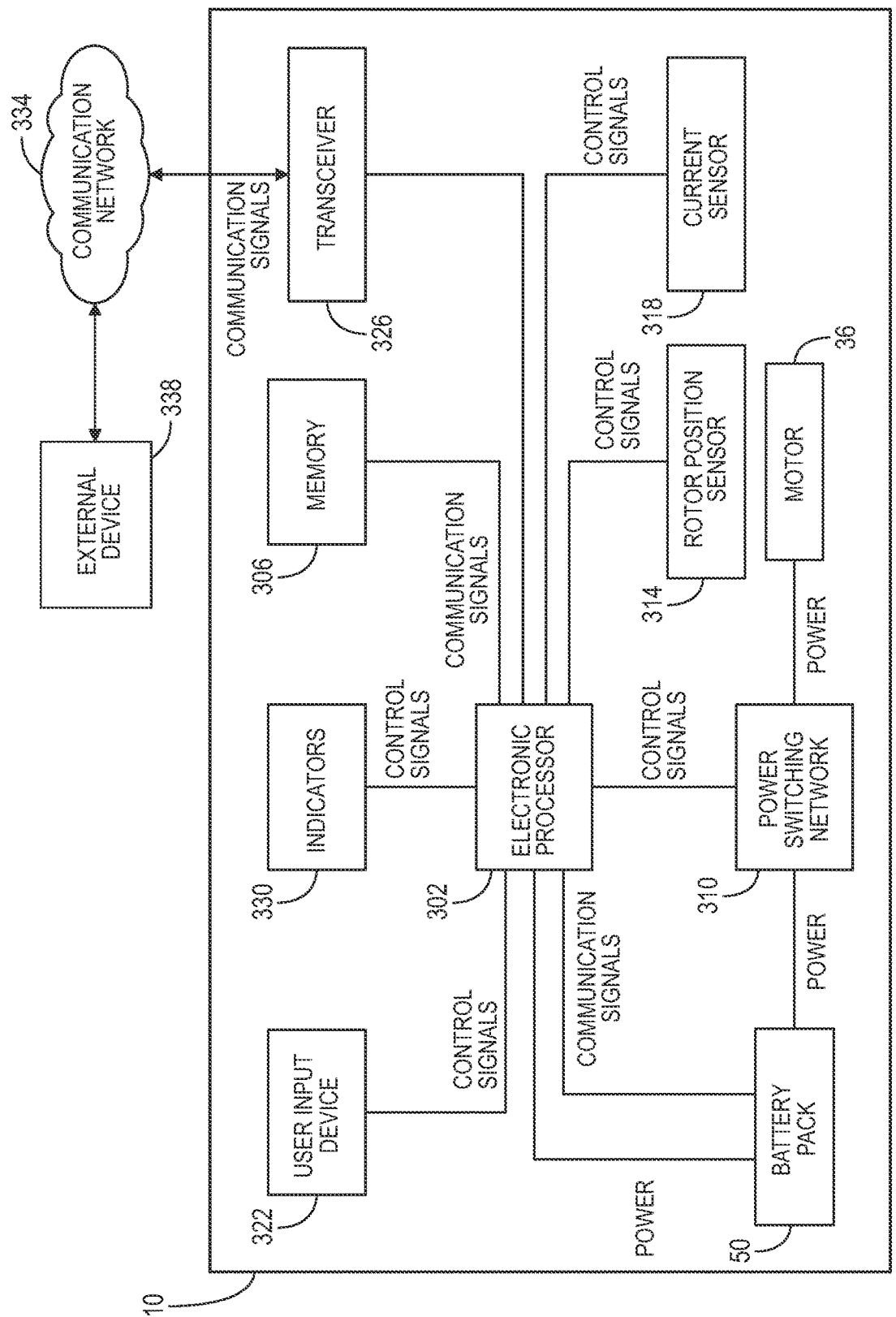
FIG. 9 is a block diagram of the gas engine replacement device of FIG. 1.

FIG. 9 illustrates a simplified block diagram of the gas engine replacement device 10 according to one example embodiment. As shown in FIG. 9, the gas engine replacement device 10 includes an electronic processor 302, a memory 306, the battery pack 50, a power switching network 310, the motor 36, a rotor position sensor 314, a current sensor 318, a user input device 322 (e.g., a trigger or power button), a transceiver 326, and indicators 330 (e.g., light-emitting diodes). In some embodiments, the gas engine replacement device 10 includes fewer or additional components than those shown in FIG. 9. For example, the gas engine replacement device 10 may include a battery pack fuel gauge, work lights, additional sensors, kill switch, the power disconnect switch 86, etc. In some embodiments, elements of the gas engine replacement device 10 illustrated in FIG. 9 including one or more of the electronic processor 302, memory 306, power switching network 310, rotor position sensor 314, current sensor 318, user input device 322 (e.g., a trigger or power button), transceiver 326, and indicators 330 (e.g., light-emitting diodes) form at least part of the control electronics 42 shown in FIG. 3, with the electronic processor 302 and the memory 306 forming at least part of the controller 46 shown in FIG. 3.

The memory 306 includes read only memory (ROM), random access memory (RAM), other non-transitory computer-readable media, or a combination thereof. The electronic processor 302 is configured to communicate with the memory 306 to store data and retrieve stored data. The electronic processor 302 is configured to receive instructions and data from the memory 306 and execute, among other things, the instructions. In particular, the electronic processor 302 executes instructions stored in the memory 306 to perform the methods described herein.

As described above, in some embodiments, the battery pack 50 is removably attached to the housing of the gas engine replacement device 10 such that a different battery pack 50 may be attached and removed to the gas engine replacement device 10 to provide different amount of power to the gas engine replacement device 10. Further description of the battery pack 50 (e.g., nominal voltage, sustained operating discharge current, size, number of cells, operation, and the like), as well as the motor 36 (e.g., power output, size, operation, and the like), is provided above with respect to FIGS. 1-8.

The power switching network 310 enables the electronic processor 302 to control the operation of the motor 36. Generally, when the user input device 322 is depressed (or otherwise actuated), electrical current is supplied from the battery pack 50 to the motor 36, via the power switching network 310. When the user input device 322 is not depressed (or otherwise actuated), electrical current is not supplied from the battery pack 50 to the motor 36. In some embodiments, the amount in which the user input device 322 is depressed is related to or corresponds to a desired speed of rotation of the motor 36. In other embodiments, the amount in which the user input device 322 is depressed is related to or corresponds to a desired torque. In other embodiments, a separate input device (e.g., slider, dial, or the like) is included on the gas engine replacement device 10 in communication with the electronic processor 302 to provide a desired speed of rotation or torque for the motor 36.

In response to the electronic processor 302 receiving a drive request signal from the user input device 322, the electronic processor 302 activates the power switching network 310 to provide power to the motor 36. Through the power switching network 310, the electronic processor 302 controls the amount of current available to the motor 36 and thereby controls the speed and torque output of the motor 36. The power switching network 310 may include numerous field-effect transistors (FETs), bipolar transistors, or other types of electrical switches. For instance, the power switching network 310 may include a six-FET bridge (see FIG. 10) that receives pulse-width modulated (PWM) signals from the electronic processor 302 to drive the motor 36.

The rotor position sensor 314 and the current sensor 318 are coupled to the electronic processor 302 and communicate to the electronic processor 302 various control signals indicative of different parameters of the gas engine replacement device 10 or the motor 36. In some embodiments, the rotor position sensor 314 includes a Hall sensor or a plurality of Hall sensors. In other embodiments, the rotor position sensor 314 includes a quadrature encoder attached to the motor 36. The rotor position sensor 314 outputs motor feedback information to the electronic processor 302, such as an indication (e.g., a pulse) when a magnet of a rotor of the motor 36 rotates across the face of a Hall sensor. In yet other embodiments, the rotor position sensor 314 includes, for example, a voltage or a current sensor that provides an indication of a back electro-motive force (back emf) generated in the motor coils. The electronic processor 302 may determine the rotor position, the rotor speed, and the rotor acceleration based on the back emf signals received from the rotor position sensor 314, that is, the voltage or the current sensor. The rotor position sensor 314 can be combined with the current sensor 318 to form a combined current and rotor position sensor. In this example, the combined sensor provides a current flowing to the active phase coil(s) of the motor 36 and also provides a current in one or more of the inactive phase coil(s) of the motor 36. The electronic processor 302 measures the current flowing to the motor based on the current flowing to the active phase coils and measures the motor speed based on the current in the inactive phase coils.

Based on the motor feedback information from the rotor position sensor 314, the electronic processor 302 can determine the position, velocity, and acceleration of the rotor. In response to the motor feedback information and the signals from the user input device 322, the electronic processor 302 transmits control signals to control the power switching network 310 to drive the motor 36. For instance, by selectively enabling and disabling the FETs of the power switching network 310, power received from the battery pack 50 is selectively applied to stator windings of the motor 36 in a cyclic manner to cause rotation of the rotor of the motor 36. The motor feedback information is used by the electronic processor 302 to ensure proper timing of control signals to the power switching network 310 and, in some instances, to provide closed-loop feedback to control the speed of the motor 36 to be at a desired level. For example, to drive the motor 36, using the motor positioning information from the rotor position sensor 314, the electronic processor 302 determines where the rotor magnets are in relation to the stator windings and (a) energizes a next stator winding pair (or pairs) in the predetermined pattern to provide magnetic force to the rotor magnets in a direction of desired rotation, and (b) de-energizes the previously energized stator winding pair (or pairs) to prevent application of magnetic forces on the rotor magnets that are opposite the direction of rotation of the rotor.

The current sensor 318 monitors or detects a current level of the motor 36 during operation of the gas engine replacement device 10 and provides control signals to the electronic processor 302 that are indicative of the detected current level. The electronic processor 302 may use the detected current level to control the power switching network 310 as explained in greater detail below.

The transceiver 326 allows for communication between the electronic processor 302 and an external device (e.g., a smart phone, tablet, or laptop computer) over a wired or wireless communication network 334. In some embodiments, the transceiver 326 may comprise separate transmitting and receiving components. In some embodiments, the transceiver 326 may comprise a wireless adapter attached to the gas engine replacement device 10. In some embodiments, the transceiver 326 is a wireless transceiver that encodes information received from the electronic processor 302 into a carrier wireless signal and transmits the encoded wireless signal to the external device 338 over the communication network 334. The transceiver 326 also decodes information from a wireless signal received from the external device 338 over the communication network 334 and provides the decoded information to the electronic processor 302.

The communication network 334 provides a wired or wireless connection between the gas engine replacement device 10 and the external device 338. The communication network 334 may comprise a short range network, for example, a BLUETOOTH network, a Wi-Fi network or the like, or a long range network, for example, the Internet, a cellular network, or the like.

As shown in FIG. 9, the indicators 330 are also coupled to the electronic processor 302 and receive control signals from the electronic processor 302 to turn on and off or otherwise convey information based on different states of the gas engine replacement device 10. The indicators 330 include, for example, one or more light-emitting diodes ("LEDs"), or a display screen. The indicators 330 can be configured to display conditions of, or information associated with, the gas engine replacement device 10. For example, the indicators 330 are configured to indicate measured electrical characteristics of the gas engine replacement device 10, the status of the gas engine replacement device 10, the mode of the gas engine replacement device 10, etc. The indicators 330 may also include elements to convey information to a user through audible or tactile outputs. In some embodiments, the indicators 330 include an eco-indicator that indicates an amount of power being used by the load during operation.

The connections shown between components of the gas engine replacement device 10 are simplified in FIG. 9. In practice, the wiring of the gas engine replacement device 10 is more complex, as the components of a gas engine replacement device are interconnected by several wires for power and control signals. For instance, each FET of the power switching network 310 is separately connected to the electronic processor 302 by a control line; each FET of the power switching network 310 is connected to a terminal of the motor 36; the power line from the battery pack 50 to the power switching network 310 includes a positive wire and a negative/ground wire; etc. Additionally, the power wires can have a large gauge/diameter to handle increased current. Further, although not shown, additional control signal and power lines are used to interconnect additional components of the gas engine replacement device 10.

Figure 10:
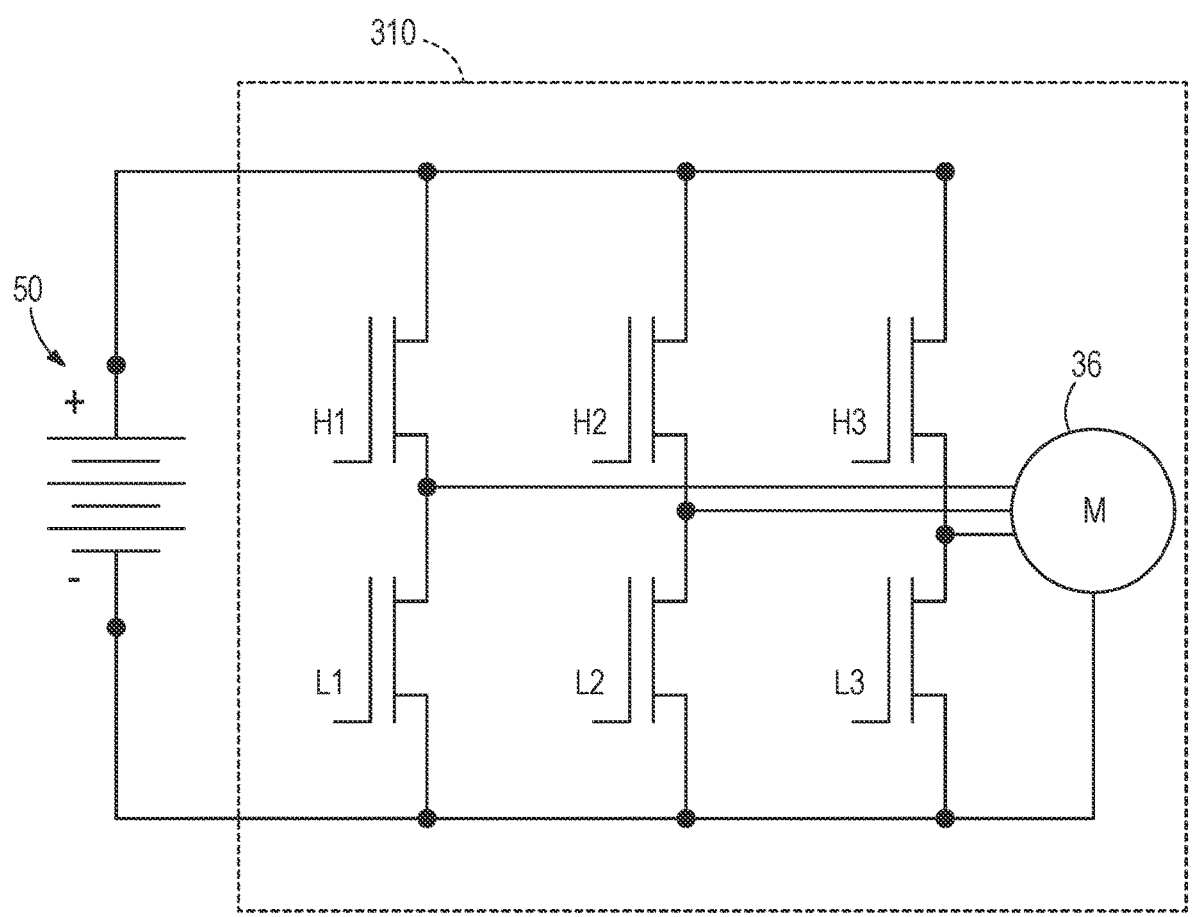
FIG. 10 is a schematic view of a power switching network for driving the motor of the gas engine replacement device of FIG. 1.

FIG. 10 illustrates one example of the power switching network 310 for driving the motor 36 of the gas engine replacement device 10. The power switching network 310 includes three high side FETs, H1, H2, and H3, and three low-side FETs, L1, L2, and L3 each having a first or conducting state and a second or non-conducting state. The power switching network 210 is used to selectively apply power from the battery pack 50 to the motor 36. An example manner in which the high-side switches and the low-side switches are controlled for operating the motor 36 in forward and reverse directions is described below.

Figure 11A:
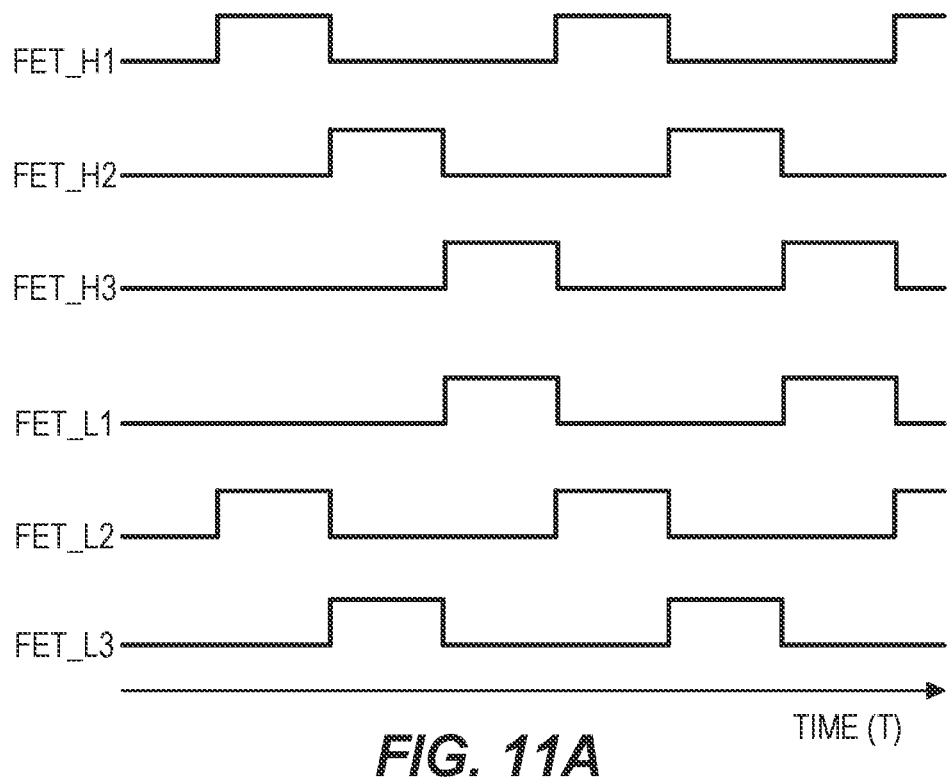
FIG. 11A is a diagram illustrating the operation of the power switching network of FIG. 10 during a forward operation of a motor.
Figure 11B:
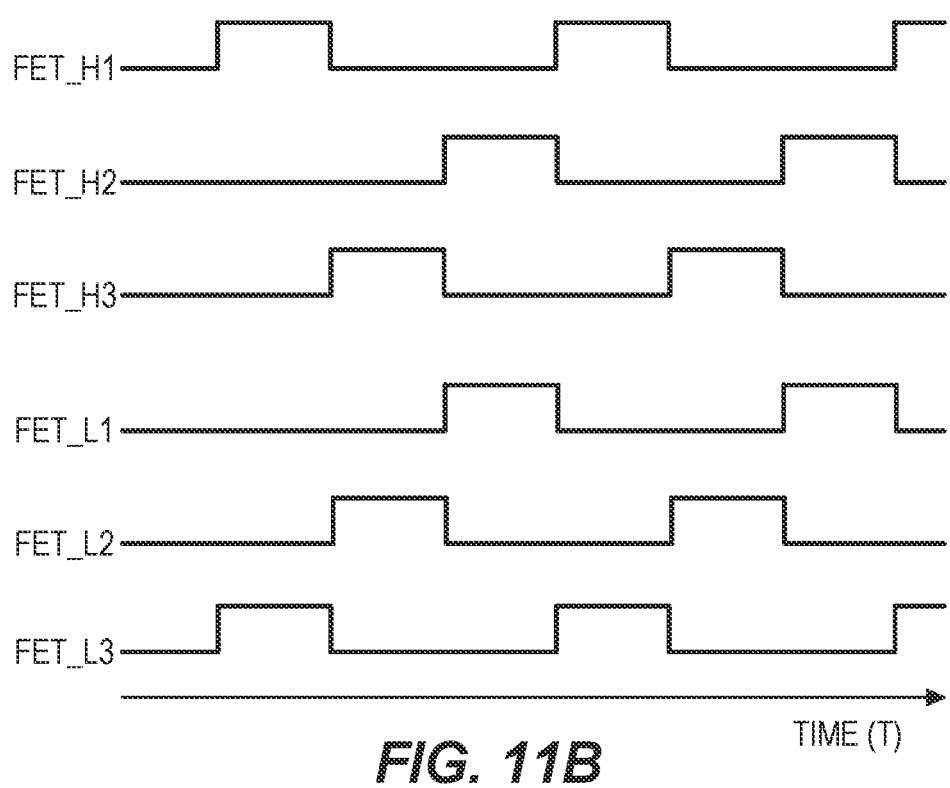
FIG. 11B is a diagram illustrating the operation of the power switching network of FIG. 10 during a reverse operation of a motor.

The high-side switches and the low side switches may be controlled using (Pulse-Width Modulated) PWM commutation, centerline commutation, or other commutations schemes. FIG. 11A illustrates a simple PWM commutation to control the motor 36 to rotate in a forward direction. As shown in FIG. 11A, each of the high-side FETs H1, H2, and H3 is periodically conducting for an entire commutation phase. When one of the FETs H1, H2, and H3 stops conducting, the next high-side FET begins conducting. Similarly, each of the low-side FETs L1, L2, and L3 is periodically conducting for an entire commutation phase. When one of the FETs L1, L2, and L3 stops conducting, the next low-side FET begins conducting. However, one or both the high-side or low-side FETs may be activated for only a period of the commutations phase (e.g., with a PWM signal having a 75%, 50%, 25%, or another duty ratio) based on the desired speed of the motor 36 or the load on the motor 36. In the example illustrated, to drive the motor 36 in a forward direction, the high-side and low-side FETs are activated in predetermined pairs and in a predetermined sequence. In the example illustrated in FIG. 11A, H1 and L2 are first activated, followed by H2 and L3 being activated next, and followed by H3 and L1 being activated next. This sequence is continued for the duration of the runtime of the motor 36 in the forward operation. FIG. 11B illustrates a simple PWM commutation to control the motor 36 to rotate in a reverse direction. In the example illustrated in FIG. 11B, H1 and L3 are first activated, followed by H3 and L2 being activated next, and followed by H2 and L1 being activated next. This sequence is continued for the duration of the runtime of the motor 36 in the reverse operation. In some embodiments, one or more variations to the sequence can be performed based on the desired motor operation. For example, one or both of the high-side and low-side FETs may be switched at a frequency during their activation phase to control the speed of the motor. Additionally, the activation phases of the high-side and low-side FETs may be shifted to create an overlap with other activations to achieve different controls (e.g., field oriented control).

Figure 12:
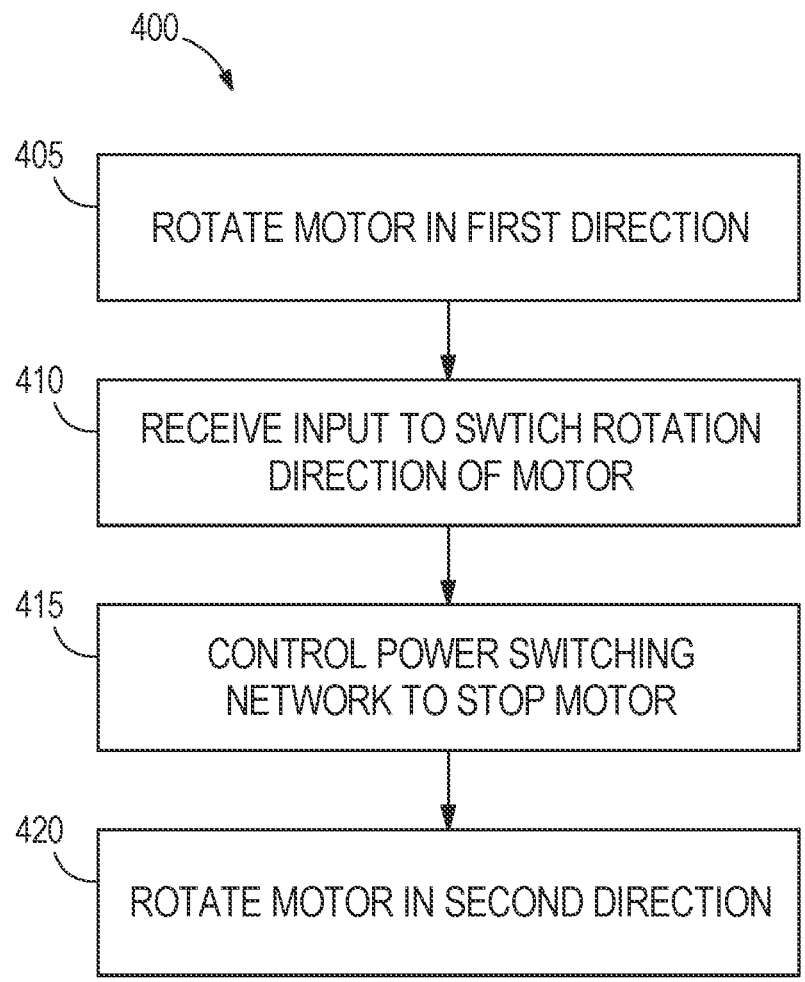
FIG. 12 is a flowchart of a method for bi-directional operation of the gas engine replacement device of FIG. 1.

FIG. 12 is a flowchart of an example method 400 for bi-directional operation of the motor 36. The method 400 includes rotating the motor 36 in a first direction (at block 405). Depending on the desired functionality of the power equipment, the motor 36 may be rotated in a forward or reverse direction. For example, the electronic processor 302 provides PWM control signals as shown in FIG. 11A to rotate the motor in a forward direction (for example, a first direction). The electronic processor 302 may adjust the duty cycle of the PWM signals to adjust the speed of operation.

The method 400 also includes receiving an input to switch a rotation direction of the motor 36 (at block 410). A user may provide the input through the user input device 322. For example, the user input device 322 may be a forward/reverse switch actuated by a user or a mode selection switch that allows the user to select a mode of operation. The user input device 322 provides a control signal to the electronic processor 302 to switch the direction of rotation of the motor 36 based on the actuation of the user input device 322. In some embodiments, the input may be received from one or more sensors of the gas engine replacement device 10 or a power equipment coupled to the gas engine replacement device 10. In some embodiments, the input may be received from, for example, a smart phone through the communication network 334.

The method 400 further includes controlling the power switching network 310 to stop the motor 36 (at block 415). The electronic processor 302 may use several techniques to stop the motor 36. In one example, the electronic processor 302 controls all the high-side and low-side FETs to turn off to allow the motor 36 to coast to a stop. Since no current is supplied to the motor when the FETs are turned off, the motor 36 comes to a stop due to the friction or load acting on the motor 36. In other examples, passive or active braking may be used to stop the motor 36. During passive braking, the electronic processor 302 may provide control signals to the high-side and low-side FETs to connect the motor to a braking load (e.g., braking coil or braking resistor coupled between one or more stator coils and ground) to quickly dissipate the energy in the motor 36 and to brake the motor 36. During active braking, the electronic processor 302 may control the high-side FETs to turn off and the low-side FETs to turn on to short the motor coils to ground and dissipate the remaining energy in the coils to ground. In other examples, the electronic processor 302 may provide control signals to the high-side and low-side FETs to perform regenerative braking and provide the energy in the motor 36 back to the battery pack 50 through the power switching network 310. In yet another example, dynamic pulsing may be used to brake the motor 36. The electronic processor 302 may provide control signals to the high-side and low-side FETs to provide an electric braking force on the rotor of the motor 36. The electronic processor 302 may monitor the rotor position sensor 314 to activate a phase (i.e., a corresponding pair of high-side and low-side FET) when the rotor has just passed the phase. For example, the rotor position sensor 314 indicates that the rotor just rotated past the phase corresponding to FETs H1 and L2. In response, the electronic processor 302 may activate the FETs H1 and L2 to drive current through stator coils to generate a magnetic field that provides a braking force to the rotor in a direction opposite the rotation direction of the rotor to stop the rotation. The electronic processor 302 may continue to activate FET pairs in a sequence, similar to FIGS. 11A, but with a timing, based on rotor position information from the rotor position sensor 314, such that the resulting magnetic field generated by the coupled stator coils continues to provide a braking force to stop the rotation.

The method 400 also includes rotating the motor 36 in a second direction after controlling the power switching network 310 to stop the motor (at block 420). For example, the electronic processor 302 provides PWM control signals as shown in FIG. 11B to rotate the motor in a reverse direction (for example, a second direction). The electronic processor 302 may adjust the duty cycle of the PWM signals to adjust the speed of operation. The method 400 repeats any time a change in rotation direction is desired.

Figure 13:
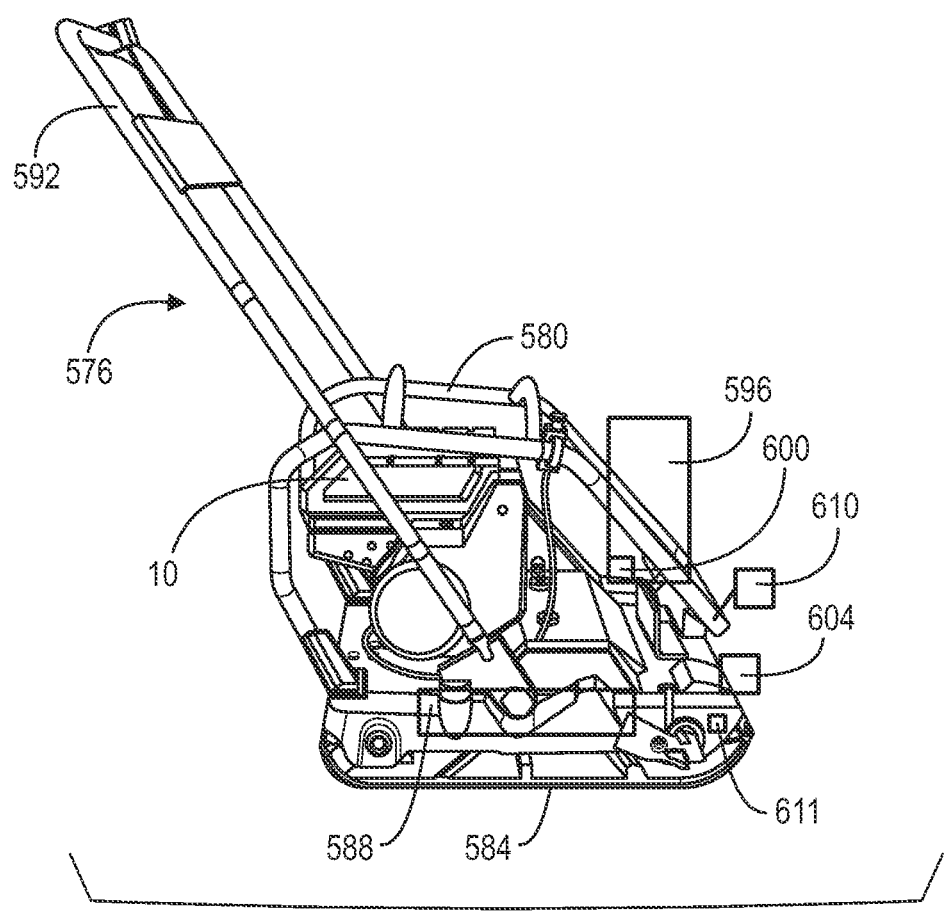
FIG. 13 is a perspective view of a compactor including the gas engine replacement device of FIG. 1.

FIG. 13 illustrates a compactor 576 including a frame 580 supporting the gas engine replacement device 10, a vibration plate 584, and a vibration mechanism 588 intermediate the gas engine replacement device 10 and vibration plate 584, such that the gas engine replacement device 10 can drive the vibration mechanism 588 to drive the vibration plate 584. The frame 580 includes a handle 592 and also supports a water tank 596 with a valve 600 through which water or other liquid can be applied to the surface to be compacted or the vibration plate 584. In some embodiments, the compactor 576 includes a paint sprayer 604 to spray and demarcate lines or boundaries in and around the compacting operation.

In operation, an operator can grasp the handle 592 and activate the gas engine replacement device 10 to drive the vibration plate 584 to compact soil or asphalt, including granular, mixed materials that are mostly non-cohesive. During operation, the operator may control the valve 600 to allow water from the water tank 596 to be applied to the compacted surface, such that in some applications, the water allows the compacted particles to create a paste and bond together, forming a denser or tighter finished surface. In addition, the water from the water tank 596 prevents asphalt or other material from adhering to the vibration plate 584 during operation.

The compactor 576 can be used in parking lots and on highway or bridge construction. In particular, the compactor 576 can be used in construction areas next to structures, curbs and abutments. The compactor 576 can also be used for landscaping for subbase and paver compaction. The compactor 576 including the gas engine replacement device 10 possesses advantages over a conventional compactor with by an internal combustion engine, some of which are discussed below. For instance, the motor 36 of the gas engine replacement device 10 can run forward or reverse, allowing the operator to shift directional bias of the vibration mechanism 588. Thus the vibration mechanism 588 is configured to move or "walk" itself forward or reverse, depending on how the operator has shifted the directional bias of the vibration mechanism 588.

Figure 14:
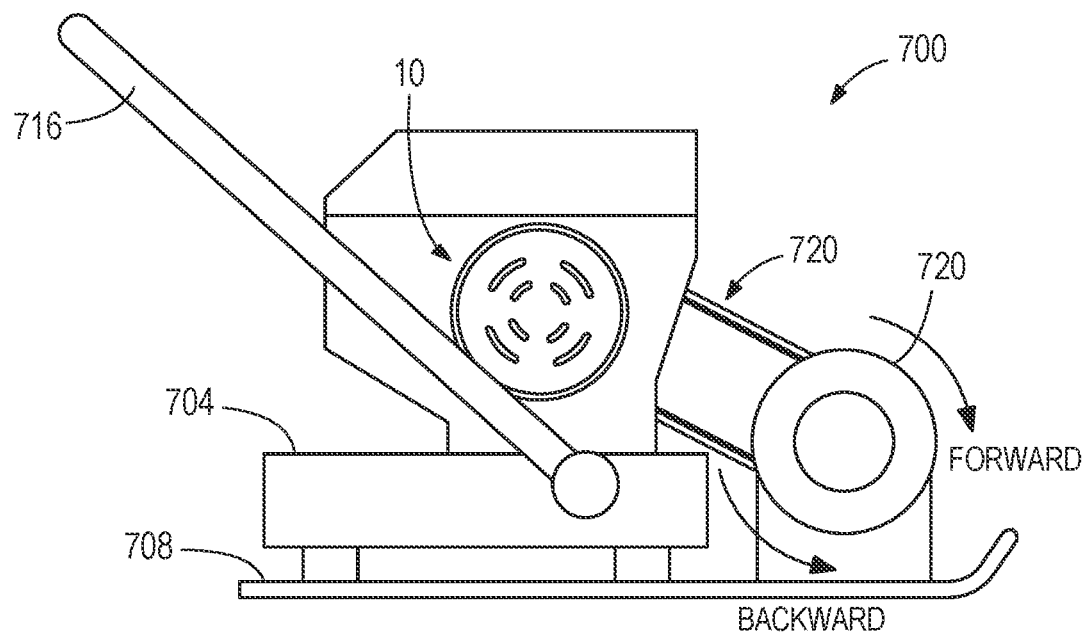
FIG. 14 is a plan view of the compactor FIG. 13.

FIG. 14 illustrates another example of a compactor 700 including a frame 704 supporting the gas engine replacement device 10, a vibrating plate 708, and a vibration mechanism 712 (e.g., an exciter) intermediate the gas engine replacement device 10 and vibrating plate 708, such that the gas engine replacement device 10 can drive the vibration mechanism 712 to drive the vibrating plate 708. The frame 704 includes a handle 716 for a user to hold and move the compactor 700. The gas engine replacement device 10 is connected to the vibration mechanism 712 using a belt 720. The belt 720 couples the power take-off shaft 38 to the vibration mechanism 712 such that when the power take-off shaft 38 rotates, the belt 720 rotates with the power take-off shaft 38 causing the vibration mechanism 712 to be excited. The vibration mechanism 712 in turn vibrates the vibrating plate 708.

Typically, gas engine plate compactors include only one mode of operation. Particularly, the gas engine may rotate the motor only in one direction, which limits the functionality of the plate compactor. In contrast, the compactor 700 includes the gas engine replacement device 10 including a motor 36 that can be rotated in both the forward and reverse directions. Accordingly, the compactor 700 is adapted to perform different functions based on the rotation direction of the motor. When the electronic processor 302 rotates the motor 36 in a first direction (e.g., as in block 405), the vibration mechanism 712 may drive the vibrating plate 708 to provide both compaction and movement in the forward direction of the compactor 700. The vibration mechanism 712 is, for example, a non-symmetrical rotating mass. As the mass rotates about an axle, the mass places an unequal force on the axle, which is then transferred to the vibrating plate 708. The vibration mechanism 712 may be located at the front of the vibrating plate 708, for example, forward of the center of mass of the vibrating plate 708, to allow for a forward movement of the vibrating plate 708. During rotation, the mass of the vibrating mechanism transmits rotational force to the vibrating plate 708 first in an upward movement lifting the front of the vibrating plate 708. The mass then transmits a force in the forward movement driving the vibrating plate 708 forward. That is, when the mass is rotated in the first direction, the vibrating plate 708 is lifted during an upward movement of the mass and the vibrating plate 708 is moved forward during a forward movement of the mass. The phase or vibration of the vibration mechanism 712 may be controlled to provide the dual functionality of compaction and movement as described above. The phase may be controlled to advance the compactor 700 forward at a slow walking pace. Accordingly, the user may operate the compactor 700 to easily navigate a work area while also providing compaction. Such operation reduces physical stress on the user.

When the electronic processor 302 rotates the motor 36 in a second direction (e.g., as in block 420), the vibration mechanism 712 may drive the vibrating plate 708 to provide only compaction without movement in the reverse direction of the compactor 700. When the mass of the vibration mechanism 712 is rotated in the second direction, the mass lifts the front of the vibrating plate 708 during an upward movement of the mass as described above. Additionally, the mass may also transfer backward movement of the mass to the vibrating plate 708. However, since the back of the vibrating plate 708 is not lifted, the friction between the ground and the vibrating plate 708 stops rearward movement of the compactor 700. The phase or vibration of the vibration mechanism 712 may be controlled to provide only the functionality of compaction as described above. Accordingly, the user may operate the compactor 700 in areas where extra compaction is desired, for example, in tight spaces. This allows the user to hover the compactor 700 where extra compaction is desired where the compactor 700 would otherwise need to be held back from advancing when operated in the forward direction. Typical gas engine plate compactors require complex mechanical clutches and linkages to drive the vibration mechanism 712 in a reverse direction. For example, a gas engine plate compactor may use two vibration mechanisms to achieve the reverse operation as described above. In contrast, the compactor 700 provides the reverse operation with only a single vibration mechanism 712 and without the need for complex mechanical clutches.

Figure 15:
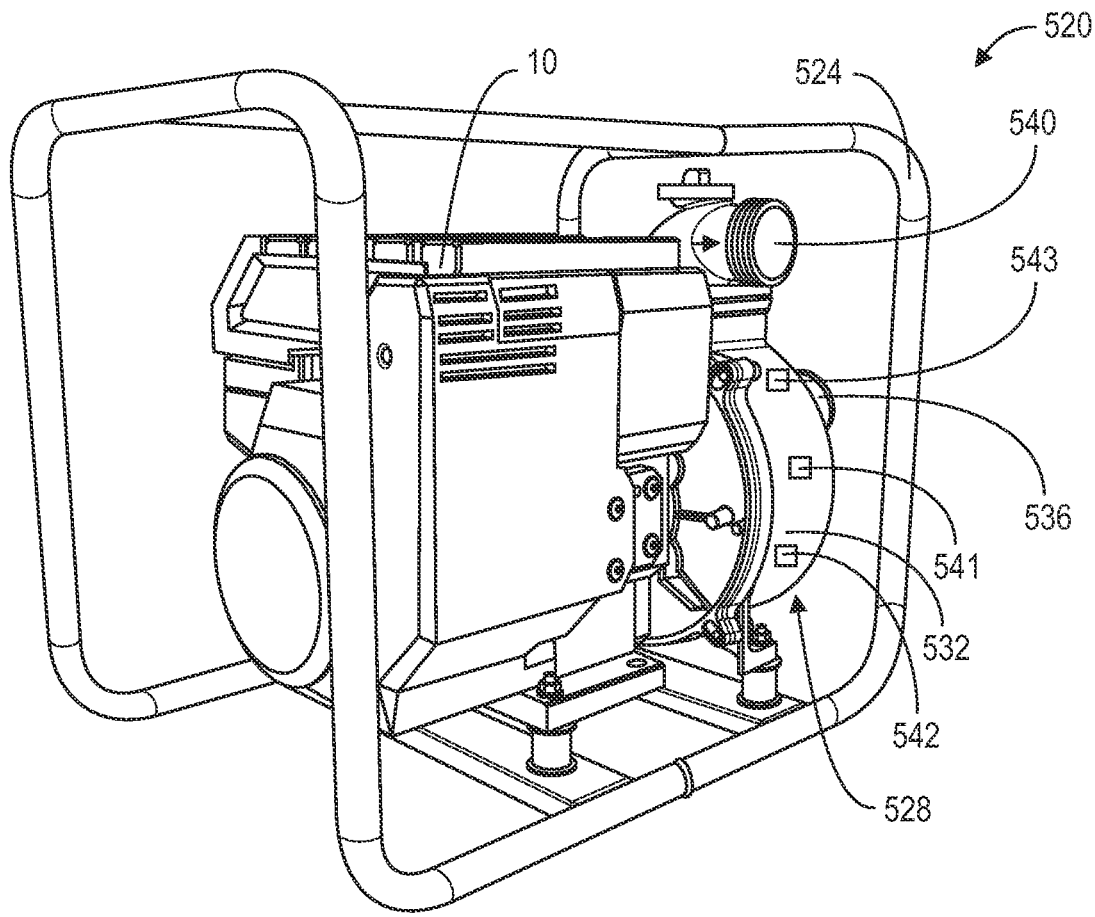
FIG. 15 is a perspective view of a pump system including the gas engine replacement device of FIG. 1.

FIG. 15 illustrates a pump system 520 including a frame 524 supporting the gas engine replacement device 10 and a pump 528 with the gas engine replacement device 10 operable to drive the pump 528. The illustrated pump 528 is a centrifugal pump having an impeller positioned within a housing 532 of the pump 528 that is rotatable about an axis to move material from an inlet 536 of the pump 528 to an outlet 540 of the pump 528. Specifically, the pump 528 is a "trash pump" that includes enough clearance between the impeller of the pump 528 and the housing 532 (e.g., 8 millimeters) to provide a mixture of a liquid (e.g., water) and debris (e.g., solid material like mud, small rocks, leases, sand, sludge, etc.) to pass through the pump 528 from the inlet 536 to the outlet 540 without the debris getting trapped within the pump 528 and decreasing the performance of the pump system 520.

Typically gas engine pumps include only one mode of operation. Particularly, the gas engine may rotate the motor only in one direction, which limits the functionality of the pump. In contrast, the pump system 520 includes the gas engine replacement device 10 including a motor 36 that can be rotated in both the forward and reverse directions. Accordingly, the pump system 520 is adapted to perform different functions based on the rotation direction of the motor. When the electronic processor 302 rotates the motor 36 in a first direction (e.g., as in block 405), the pump 528 may drive the impeller in a forward direction to move material from an inlet 536 of the pump 528 to an outlet 540 of the pump 528. When the electronic processor 302 rotates the motor 36 in a second direction (e.g., as in block 420), the pump 528 may drive the impeller to clear jams or clear the pump 528 if debris is stuck within the pump 528 (without utilizing a transmission including a forward gear and a rearward gear). In some embodiments, the motor 36 may controlled by the electronic processor 302 to rotate at slower speed in the second direction than in the first direction to clear jams in the pump 528. For example, the electronic processor 302 may provide PWM signals to the FETs of the power switching network 310 with a higher duty ratio when driving in the first direction than the duty ratio when driving in the second direction, to rotate the motor 36 at a higher speed in the first direction than in the second direction.

Figure 16:
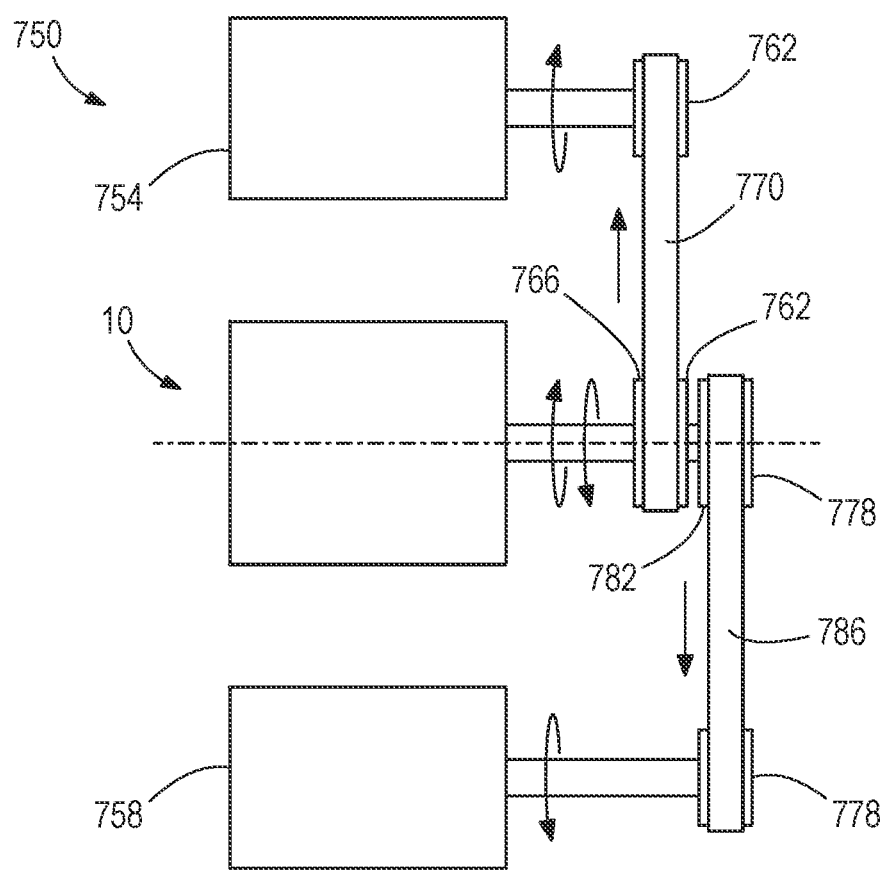
FIG. 16 is a schematic of an outdoor power equipment including the gas engine replacement device of FIG. 1.

FIG. 16 illustrates an example of an outdoor power equipment 750 including the gas engine replacement device 10, a first equipment bit 754, and a second equipment bit 758. The first equipment bit 754 is coupled to the power take-off shaft 38 of the gas engine replacement device 10 using a first clutching mechanism 762. In the example illustrated, the first clutching mechanism 762 includes a first one-way clutch 766 mounted to the power take-off shaft 38. A first belt 770 couples the first one-way clutch 766 to the first equipment bit 754. The first one-way clutch 766 is, for example, a sprag bearing or the like that transmits the rotational motion to the first belt 770 when the power take-off shaft 38 is rotating in a first direction, but does not transmit the rotational motion to the first belt 770 when the power take-off shaft 38 is rotating in a second opposite direction. Accordingly, the first clutching mechanism 762 activates the first equipment bit 754 when the motor 36 is rotating in a first direction, and deactivates the first equipment bit 754 when the motor 36 is rotating in a second direction. The first one-way clutch 766 and the first belt 770 are one example implementation of the first clutching mechanism 762. In some implementations, different mechanical components may be used to implement the first clutching mechanism 762 that activates the first equipment bit 754 only when the rotor is rotating in the first direction.

The second equipment bit 758 is coupled to the power take-off shaft 38 of the gas engine replacement device 10 using a second clutching mechanism 778. In the example illustrated, the second clutching mechanism 778 includes a second one-way clutch 782 mounted to the power take-off shaft 38. A second belt 786 couples the second one-way clutch 782 to the second equipment bit 758. The second one-way clutch 782 is, for example, a sprag bearing or the like that transmits the rotational motion to the second belt 786 when the power take-off shaft 38 is rotating in the second direction, but does not transmit the rotational motion to the second belt 786 when the power take-off shaft 38 is rotating in the first direction. Accordingly, the second clutching mechanism 778 activates the second equipment bit 758 when the motor 36 is rotating in the second direction, and deactivates the second equipment bit 758 when the motor 36 is rotating in the first direction. The second one-way clutch 782 and the second belt 786 are one example implementation of the second clutching mechanism 778. In some implementations, different mechanical components may be used to implement the second clutching mechanism 778 that activates the second equipment bit 758 only when the rotor is rotating in the second direction.

The outdoor power equipment 750 is, for example, a double-exciter plate compactor. In this example, the first equipment bit 754 is a first vibration mechanism configured to drive a first vibrating plate and the second equipment bit 758 is a second vibration mechanism configured to drive a second vibrating plate. When the motor 36 is rotated in the first direction, the power is transmitted via the first clutching mechanism 762 to the first vibration mechanism. The first vibration mechanism thereby drives the first vibrating plate and advances the plate compactor in, for example, a forward direction. When the motor 36 is rotated in the second direction, the power is transmitted via the second clutching mechanism 778 to the second vibration mechanism. The second vibration mechanism thereby drives the second vibrating plate and advances the plate compactor in, for example, a reverse direction.

Figure 17:
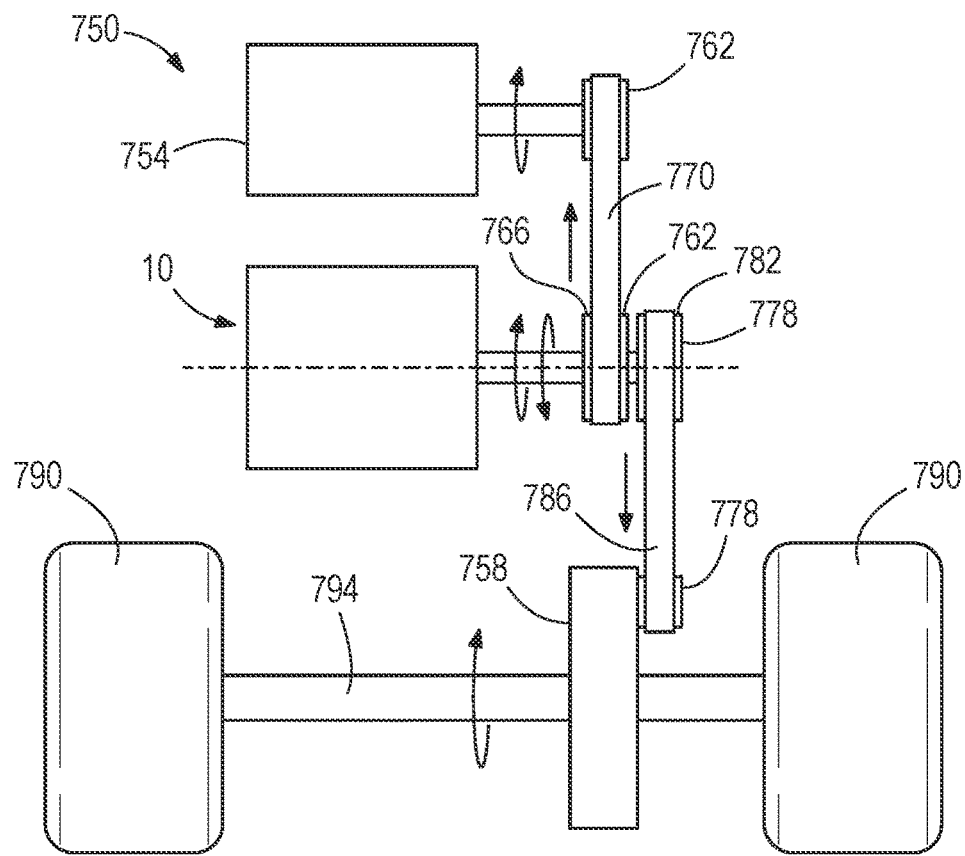
FIG. 17 is a schematic of an outdoor power equipment including the gas engine replacement device of FIG. 1.

FIG. 17 illustrates another example outdoor power equipment 750 (e.g., a wheeled plate compactor). In the example illustrated, the outdoor power equipment 750 includes wheels 790 that advance the outdoor power equipment 750 on the ground. In this example, the first equipment bit 754 is a vibration mechanism configured to drive a vibrating plate and the second equipment bit 758 configured to drive an axle 794 coupled to the wheels 790. When the motor 36 is rotated in the first direction, the power is transmitted via the first clutching mechanism 762 to the vibration mechanism. The vibration mechanism thereby drives the vibrating plate. When the motor 36 is rotated in the second direction, the power is transmitted via the second clutching mechanism 778 to the wheels 790. The wheels 790 can be used to drive the outdoor power equipment 750.

Figure 18:
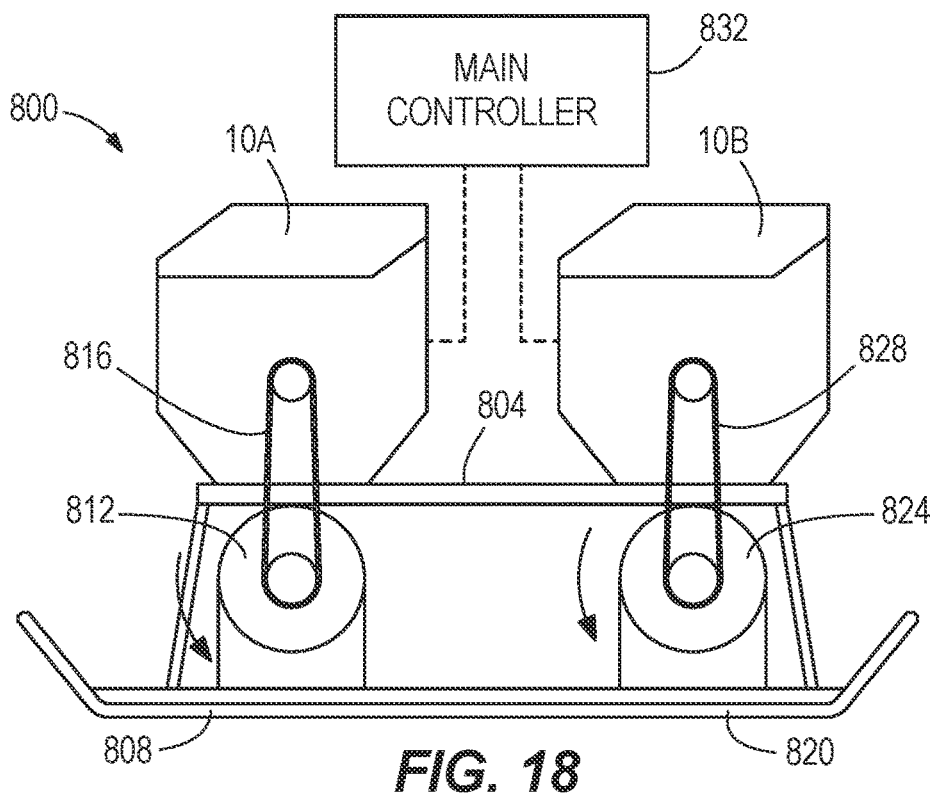
FIG. 18 is a schematic of a compactor including two gas engine replacement devices of FIG. 1.

FIG. 18 illustrates an example double-exciter compactor 800 including a frame 804 supporting two of the gas engine replacement devices 10, labeled as a first gas engine replacement device 10A and a second gas engine replacement device 10B. The frame further supports a first vibrating plate 808 and a first vibration mechanism 812 (e.g., a first exciter) intermediate the first gas engine replacement device 10A and the first vibrating plate 808, such that the first gas engine replacement device 10A can drive the first vibration mechanism 812 to drive the first vibrating plate 808. The first gas engine replacement device 10A is connected to the first vibration mechanism 812 using a first belt 816. The first belt 816 couples a first power take-off shaft 38A of the first gas engine replacement device 10A to the first vibration mechanism 812 such that when the first power take-off shaft 38A rotates, the first belt 816 rotates with the first power take-off shaft 38A causing the first vibration mechanism 812 to be excited. The first vibration mechanism 812 in turn vibrates the first vibrating plate 808.

The double-exciter compactor 800 also includes the second gas engine replacement device 10B, a second vibrating plate 820, and a second vibration mechanism 824 (e.g., a second exciter) intermediate the second gas engine replacement device 10B and the second vibrating plate 820, such that the second gas engine replacement device 10B can drive the second vibration mechanism 824 to drive the second vibrating plate 820. The second gas engine replacement device 10B is connected to the second vibration mechanism 824 using a second belt 828. The second belt 828 couples the second power take-off shaft 38B to the second vibration mechanism 824 such that when the second power take-off shaft 38B rotates, the second belt 828 rotates with the second power take-off shaft 38B causing the second vibration mechanism 824 to be excited. The second vibration mechanism 824 in turn vibrates the second vibrating plate 820.

The double-exciter compactor 800 further includes a main controller 832 coupled to the first gas engine replacement device 10A to provide control signals to a first electronic processor 302A of the first gas engine replacement device 10A and coupled to the second gas engine replacement device 10B to provide control signals to a second electronic processor 302B of the second gas engine replacement device 10B. The main controller 832 may be implemented similar to the electronic processor 302 and provides control signals to the first electronic processor 302A and the second electronic processor 302B based on a selected mode of operation or a desired operation of the double-exciter compactor 800.

Figure 19:
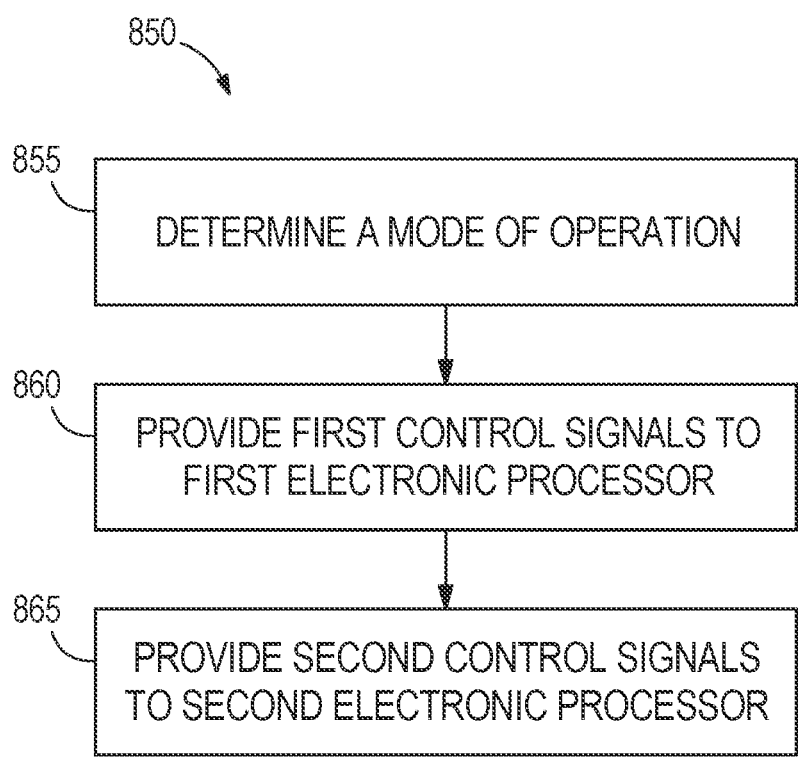
FIG. 19 is a flowchart of a method for operation of the compactor of FIG. 18.

FIG. 19 is a flowchart of an example method 850 for operation of the double-exciter compactor 800. The method 850 includes determining, using the main controller 832, a mode of operation of the compactor 800 (at block 855). The main controller 832 may receive user inputs through a user input device of the compactor 800 (e.g., a mode selector slider, dial, or push button) or via a communication network from the external device 338 provided based on input received via a graphical user interface on the external device 338. The user inputs indicate a mode of operation of the compactor 800. The modes of operation of the compactor 800 include, for example, a forward-advance compaction, a rearward-advance compaction, a neutral compaction. Each mode may correspond to a specific control of the first gas engine replacement device 10A and the second gas engine replacement device 10B. The mapping between the mode of operation and the controls for the first gas engine replacement device 10A and the second gas engine replacement device 10B may be stored in a memory of the main controller 832.

The method 850 also includes providing, using the main controller 832, first control signals to the first electronic processor 302A based on the mode of operation (at block 860) and providing, using the main controller 832, second control signals to the second electronic processor 302B based on the mode of operation (at block 865). As discussed above, the main controller 832 may determine the specific controls for the first gas engine replacement device 10A and the second gas engine replacement device 10B based on the mode of operation and provide the corresponding control signals to the first gas engine replacement device 10A and the second gas engine replacement device 10B. For example, when a user selects a forward-advance compaction, the main controller 832 may provide first control signals and second control signals to control the speed, direction, and phase offset of the first gas engine replacement device 10A and the second gas engine replacement device 10B. By controlling the speed, direction, and/or phase offset of the first gas engine replacement device 10A and the second gas engine replacement device 10B, the vibrating plates 808, 820 may be controlled to provide compaction and to advance in the forward direction. In one example, forward-advance compaction may be achieved by controlling the motors 36 of the first gas engine replacement device 10A and the second gas engine replacement device 10B to rotate in the first direction.

In another example, when a user selects a rearward-advance compaction, the main controller 832 may provide first control signals and second control signals to control the speed, direction, and phase offset of the first gas engine replacement device 10A and the second gas engine replacement device 10B. By controlling the speed, direction, and/or phase offset of the first gas engine replacement device 10A and the second gas engine replacement device 10B, the vibrating plates 808, 820 may be controlled to provide compaction and to advance in the rearward direction. In one example, rearward-advance compaction may be achieved by controlling the motors 36 of the first gas engine replacement device 10A and the second gas engine replacement device 10B to rotate in the second direction.

In yet another example, when a user selects a neutral compaction, the main controller 832 may provide first control signals and second control signals to control the speed, direction, and/or phase offset of the first gas engine replacement device 10A and the second gas engine replacement device 10B. By controlling the speed, direction, and/or phase offset of the first gas engine replacement device 10A and the second gas engine replacement device 10B, the vibrating plates 808, 820 may be controlled to provide compaction while remaining stationary. In one example, neutral compaction may be achieved by controlling the motors 36 of the first gas engine replacement device 10A and the second gas engine replacement device 10B to rotate in the opposite directions. That is, controlling the motor 36 of the first gas engine replacement device 10A to rotate in the forward direction and controlling the motor 36 of the second gas engine replacement device 10B to rotate in the reverse direction, or vice versa.

The method 850 repeats for each mode selection or mode change of the compactor 800. One of ordinary skill in the art appreciates that the main controller 832 may be used to operate the double-exciter compactor 800 in several other modes not explicitly described herein. Additionally, in some embodiments, the functionality of the main controller 832 is incorporated into one of the electronic processors of the first or second gas engine replacement devices 10A, 10B and the main controller 832 is not included in the double-exciter compactor 800.

The several outdoor power equipment described above driven by the gas engine replacement device 10 includes many advantages over conventional equipment driven by an internal combustion engine, some of which are discussed below.

In some embodiments, the gas engine replacement device 10 can be mated with a new equipment and the memory 306 can be reprogrammed to optimize the gas engine replacement device 10 for operation with the new equipment. In some embodiments, the electronic processor 302 automatically recognizes which type of new equipment the gas engine replacement device 10 has been mated with, and governs operation of the gas engine replacement device 10 accordingly. In some embodiments, the electronic processor 302 can automatically detect with which equipment the gas engine replacement device 10 has been mated via Radio Frequency Identification (RFID) communication with the new equipment.

In some embodiments, the memory 306 is reprogrammable via either BLUETOOTH or Wi-Fi communication protocols. In some embodiments, the electronic processor 302 has control modes for different uses of the same equipment. The control modes may be preset or user-programmable, and may be programmed remotely via BLUETOOTH or Wi-Fi. In some embodiments, the electronic processor 302 utilizes master/slave equipment-to-equipment communication and coordination, such that the gas engine replacement device 10 can exert unidirectional control over equipment, or an operator can use a smartphone application to exert unidirectional control over the gas engine replacement device 10.

In some embodiments, the operator or original equipment manufacturer (OEM) is allowed limited access to control the speed of the gas engine replacement device 10 through the electronic processor 302 via, e.g., a controller area network (CAN)-like interface. In some embodiments, the electronic processor 302 is capable of a wider range of speed selection with a single gear set in the gear train 110 than a gasoline engine. For example, the control electronics 42 are configured to drive the motor 36 at less than 2,000 RPM, which is lower than any speed a gasoline engine is capable of, which permits the associated equipment to have a greater overall runtime over a full discharge of the battery pack 50, than a gasoline engine. Additionally the control electronics 42 are configured to drive the motor at more than 3,600 RPM, which is higher than any speed a gasoline engine is capable of, and with the capability to deliver more torque. The wider range of speeds of motor 36 offers greater efficiency and capability than a gasoline engine. In some embodiments, the operator could have access to control the current drawn by the motor 36 in addition to the speed.

In some embodiments, the electronic processor 302 is configured to log and report data. For example, the electronic processor 302 is configured to provide wired or wireless diagnostics for monitoring and reading the status of the gas engine replacement device 10. For example, the electronic processor 302 can monitor and log gas engine replacement device 10 runtime for example, in a rental scenario. In some embodiments, the motor 36 and the electronic processor 302 use regenerative braking to charge the battery pack 50. In some embodiments, the gas engine replacement device 10 includes a DC output for lights or accessories. In some embodiments, the electronic processor 302 can detect anomalies or malfunctions of the gas engine replacement device 10 via voltage, current, motion, speed, and/or thermocouples. In some embodiments, the electronic processor 302 can detect unintended use of or stoppage of the gas engine replacement device 10. If the equipment driven by the gas engine replacement device 10 is not running with the intended characteristics or is not being used correctly or safely, the electronic processor 302 can detect the anomaly and deactivate the gas engine replacement device 10. For example, the gas engine replacement device 10 can include one or more accelerometers to sense if the gas engine replacement device 10 and equipment is in the intended orientation. And, if the electronic processor 302 determines that the gas engine replacement device 10 is not in the intended orientation (i.e. the equipment has fallen over), the electronic processor 302 can deactivate the gas engine replacement device 10.

In some embodiments, the gas engine replacement device 10 includes accessible sensor ports (not shown) to electrically connect with user-selected sensors for use with the piece of power equipment, such as accelerometers, gyroscopes, GPS units, or real time clocks, allowing an operator to customize the variables to be sensed and detected by the electronic processor 302. In some embodiments, the electronic processor 302 can indicate the status of the battery pack 50, such as when the battery is running low, to an operator via visual, audio, or tactile notifications. In some embodiments, the electronic processor 302 can operate an auxiliary motor that is separate from the motor 36 to drive an auxiliary device such as a winch. The auxiliary motor may be internal or external to the gas engine replacement device 10.

In some embodiments, the gas engine replacement device 10 can include digital controls on a customizable user interface, such as a touch display or a combination of knobs and buttons. In contrast, an analog gasoline engine does not include such digital controls. In some embodiments, the user interface for the gas engine replacement device 10 can be modular, wired, or wireless and can be attachable to the gas engine replacement device 10 or be hand held. In some embodiments, the gas engine replacement device 10 can be controlled with a remote control that includes status indicators for certain characteristics of the gas engine replacement device 10, such as charge of the battery pack 50 and the temperature. In some embodiments, the gas engine replacement device 10 can provide status indications with a remote, programmable device.

We claim:

1. A gas-engine replacement device comprising:
   a housing;
   a battery receptacle coupled to the housing and configured to removably receive a battery pack;
   a motor located within the housing;
   a power take-off shaft receiving torque from the motor and protruding from a side of the housing;
   a power switching network configured to selectively provide power from the battery pack to the motor; and
   an electronic processor coupled to the power switching network and configured to control the power switching network to rotate the motor, the electronic processor configured to:
   rotate the motor in a first direction,
   receive an input to switch a rotation direction of the motor, and
   in response to receiving the input to switch the rotation direction of the motor:
      (i) control the power switching network to stop the motor by performing one selected from a group consisting of:
         coasting the motor to a stop, applying passive braking to stop the motor, applying active braking to stop the motor, and dynamically pulsing the motor in opposite phases to the first direction, and
      (ii) after controlling the power switching network to stop the motor in (i), rotate the motor in a second direction.

2. The gas-engine replacement device of claim 1, further comprising:
   elastomeric members positioned on the battery receptacle, wherein the elastomeric members are configured to reduce vibrations transferred from the motor to the battery pack.

3. The gas-engine replacement device of claim 1, further comprising:
   a gear train coupled between an output shaft of the motor and the power take-off shaft, wherein a direction of rotation of the power take-off shaft is switched from the first direction to the second direction without shifting gears of the gear train.

4. The gas-engine replacement device of claim 1, wherein an operating temperature of an exterior surface of the housing of the gas-engine replacement device is below 95 degrees Celsius.

5. The gas-engine replacement device of claim 1, further comprising:
   a transceiver coupled to the electronic processor for communicating with an external device, wherein the input to switch the rotation direction of the motor is received from the external device.

* * * * *